US011137797B2

(12) United States Patent
Claudepierre et al.

(10) Patent No.: US 11,137,797 B2
(45) Date of Patent: Oct. 5, 2021

(54) ADJUSTABLE STAND AND MOBILE COMPUTING DEVICE SYSTEM

(71) Applicant: GOOGLE LLC, Mountain View, CA (US)

(72) Inventors: Vincent Claudepierre, San Francisco, CA (US); Joe Tsao, Grandview, MO (US)

(73) Assignee: GOOGLE LLC, Mountain View, CA (US)

( * ) Notice: Subject to any disclaimer, the term of this patent is extended or adjusted under 35 U.S.C. 154(b) by 142 days.

(21) Appl. No.: 16/137,314

(22) Filed: Sep. 20, 2018

(65) Prior Publication Data
US 2020/0097045 A1 Mar. 26, 2020

(51) Int. Cl.
G06F 1/16 (2006.01)
H04M 1/02 (2006.01)
H04M 1/04 (2006.01)

(52) U.S. Cl.
CPC ........ *G06F 1/1632* (2013.01); *H04M 1/0254* (2013.01); *H04M 1/04* (2013.01); *G06F 1/1626* (2013.01)

(58) Field of Classification Search
CPC .... G06F 1/1632; G06F 1/1616; G06F 1/1626; G06F 1/1624; G06F 1/1656;
(Continued)

(56) References Cited

U.S. PATENT DOCUMENTS 8,630,686 B2* 1/2014 Holman, IV ........ H04M 1/0237
455/575.3
8,897,033 B2* 11/2014 Slipy ................... H04M 1/0202
248/70

(Continued)

FOREIGN PATENT DOCUMENTS

CN 107450664 A 12/2017

OTHER PUBLICATIONS

International Search Report and Written Opinion for Application No. PCT/US2019/051978, dated Dec. 18, 2019, 24 pages
(Continued)

*Primary Examiner* — Marcus Hammonds
(74) *Attorney, Agent, or Firm* — Brake Hughes Bellermann LLP

(57) ABSTRACT

Systems, devices, and apparatuses for adjustable stands and mobile computing devices are provided. An example system includes a mobile computing device having a front surface with a display and a rear surface with a first magnetically susceptible region and a second magnetically susceptible region. The first magnetically susceptible region is offset from the second magnetically susceptible region in a translational dimension along the rear surface. The example system also includes an adjustable stand for the mobile computing device. The adjustable stand includes a slidable portion formed with a magnetically susceptible material to slide in the translational dimension along the rear surface. The level of magnetic attraction between the slidable portion and the second magnetically susceptible material of the mobile computing device is greater than a level of magnetic attraction between the slidable portion and the first magnetically susceptible material of the mobile computing device.

24 Claims, 17 Drawing Sheets

(58) Field of Classification Search
CPC .................. G06F 3/0202; G06F 1/166; G06F 2200/1633; A45C 2011/002; A45C 2011/003; A45C 2200/15; H04B 1/3888; H04B 1/3833; H04M 1/0283; H04M 1/0214; H04M 1/18; H04M 1/0216; H04M 2250/16; H04M 2201/08; H04M 1/04; H04M 1/0254; H04M 1/0237; H04M 1/0247; H04M 1/23; H04M 1/0235; H04M 1/0245; H04M 1/72527; H04L 31/3833
See application file for complete search history.

(56) References Cited

U.S. PATENT DOCUMENTS

| | | | |
|---|---|---|---|
| 9,036,340 B1 | 5/2015 | Colby et al. | |
| 9,131,756 B2 | 9/2015 | Hurst et al. | |
| 9,170,611 B2* | 10/2015 | Gallagher | F16M 11/105 |
| 9,195,263 B2* | 11/2015 | Mack | F16M 11/00 |
| 9,225,377 B1 | 12/2015 | Hart | |
| 9,769,293 B2* | 9/2017 | Gu | H04M 1/0235 |
| 10,136,714 B2* | 11/2018 | Marks | G06F 1/1628 |
| 2012/0068942 A1* | 3/2012 | Lauder | H01F 7/0205 |
| | | | 345/173 |
| 2013/0214661 A1 | 8/2013 | McBroom | |
| 2014/0043741 A1* | 2/2014 | Smith | H05K 5/02 |
| | | | 361/679.3 |
| 2014/0151248 A1* | 6/2014 | Hurst | A45C 13/1069 |
| | | | 206/45.23 |
| 2014/0299740 A1* | 10/2014 | Peng | G06F 1/1632 |
| | | | 248/688 |
| 2015/0055284 A1 | 2/2015 | Han | |
| 2015/0141092 A1* | 5/2015 | Murauyou | G06F 1/166 |
| | | | 455/575.8 |
| 2016/0246327 A1* | 8/2016 | Matlin | H01F 7/0247 |
| 2017/0351299 A1* | 12/2017 | Li | G06F 3/0202 |

OTHER PUBLICATIONS

Communication pursuant to Article 94(3) EPC for European Application No. 19780485.9, dated Jul. 1, 2021, 6 pages.

* cited by examiner

ADJUSTABLE STAND AND MOBILE COMPUTING DEVICE SYSTEM

RELATED APPLICATIONS

This application is related to the U.S. Provisional Patent Application titled "ELECTRONIC DEVICE WITH HOUSING HAVING STIFFENER," filed on Sep. 20, 2018, and having the No. 62/734,105, and the U.S. Provisional Patent Application titled "COMPUTING DEVICE AND FOLIO MODE-DETECTION SYSTEM," filed on Sep. 20, 2018, and having the No. 62/734,095, the disclosures of which are hereby incorporated by reference in their entireties.

BACKGROUND

Mobile computing devices, such as tablets and smartphones, are quite common and popular. These mobile computing devices may provide some or all of the functionality of a traditional personal computer but in a smaller more portable form factor. For example, a mobile computing device may have a shape that is similar to a thin rectangular prism. A front surface of the rectangular prism may include a display. A protective cover may be used with a mobile computing device to increase the mobile computing device's resiliency.

SUMMARY

This document relates, generally, to a cover and adjustable stand system for mobile computing devices. In some implementations, the system allows the mobile computing device stand to smoothly adjust a position of the mobile computing device.

One aspect is a system comprising a mobile computing device, including: a front surface having a display; a rear surface having a first magnetically susceptible region and a second magnetically susceptible region, the first magnetically susceptible region being offset from the second magnetically susceptible region in a translational dimension along the rear surface; and an adjustable stand for the mobile computing device, including a slidable portion formed with a magnetically susceptible material to slide in the translational dimension along the rear surface, wherein a level of magnetic attraction between the slidable portion and the second magnetically susceptible region of the mobile computing device is greater than a level of magnetic attraction between the slidable portion and the first magnetically susceptible region of the mobile computing device.

Another aspect is a mobile computing device, comprising: a front surface having a display; and a rear surface opposite the front surface and coupled to the front surface by an edge region, the rear surface including: a first magnetically susceptible region; and a second magnetically susceptible region adjacent to the first magnetically susceptible region, the second magnetically susceptible region having a greater magnetic susceptibility than the first magnetically susceptible region.

Yet another aspect is an apparatus comprising: a base panel sized to substantially cover a front surface of a mobile computing device; an adjustable panel sized to substantially cover a rear surface of the mobile computing device that is formed from: a slidable portion that includes a magnetically susceptible material; a rotatable portion rotatably coupled to the slidable portion; and a base portion rotatably coupled to the rotatable portion; a fabric hinge rotatably coupling the base panel to the adjustable panel; and a dock coupled to the fabric hinge and configured to be removably coupled to a side of the mobile computing device.

The details of one or more implementations are set forth in the accompanying drawings and the description below. Other features will be apparent from the description and drawings, and from the claims.

BRIEF DESCRIPTION OF DRAWINGS

Like reference symbols in the various drawings indicate like elements.

DETAILED DESCRIPTION

Figure 1:
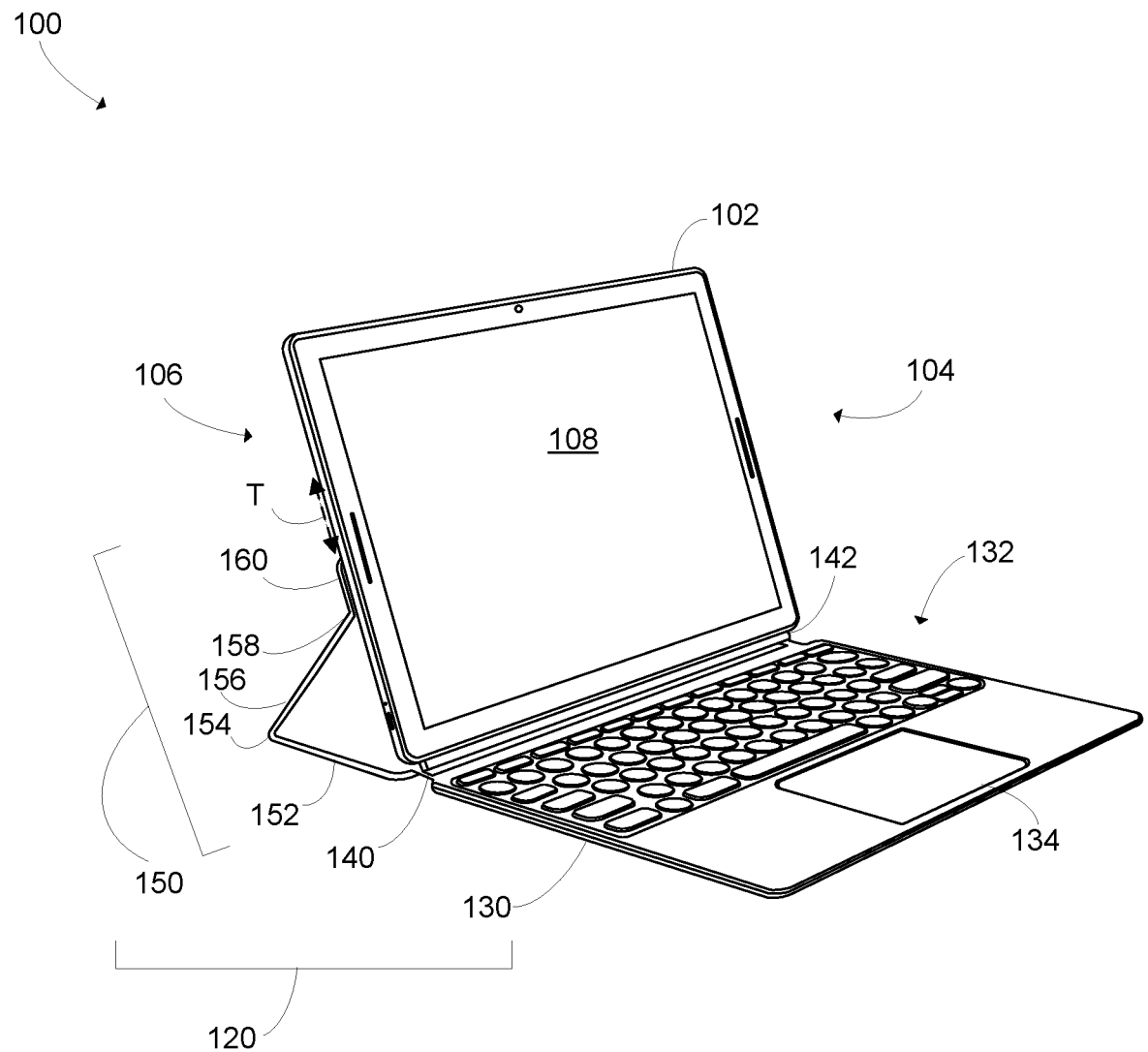
FIG. 1 is a schematic diagram of an embodiment of a system that includes a mobile computing device and adjustable stand.

This document describes examples of systems that include an adjustable stand and associated computing device. The system may be arranged in various configurations. For example, the adjustable stand may be arranged to prop up or position the mobile computing device so that a display of the mobile computing device may be more easily viewed.

In some implementations, a slidable portion of the adjustable stand is magnetically attracted to a first region of the mobile computing device and may be configured to slide (also can be referred to as move) across a rear surface of the mobile computing device in a translational dimension (e.g., in a dimension aligned with a short axis of the rear surface of the mobile computing device). Sliding across the rear surface may include moving laterally across the surface while being in contact with the rear surface. As the slidable portion slides along the translational dimension, a portion of the adjustable stand folds or unfolds, adjusting the angle at which the mobile computing device is oriented changes. This sliding motion of the slidable portion across the first region of back surface of the mobile computing device may allow for very fine-grain adjustment (e.g., infinite adjustment, non-discrete adjustment) of the viewing angle of the mobile computing device.

The rear surface of the mobile computing device may also include additional regions to which the slidable portion is magnetically attracted. In some implementations, these additional regions are configured to generate a stronger magnetic attraction with the slidable portion so as to impede sliding motion through the additional regions. These additional regions may be disposed on opposite sides of the first region so as to serve as detents (e.g., hold locations, magnetic detents, magnetic hold locations) to the sliding movement of the slidable portion. These additional regions may, for example, stop the slidable portion from sliding out of contact with the mobile computing device or sliding the adjustable stand into an unstable arrangement.

The adjustable stand may also include one or more user input devices that are configured to receive user inputs for the mobile computing device. The adjustable stand may include a dock that is configured to removably couple to a port on the mobile computing device through which electronic signals corresponding to received user inputs may be communicated. In some implementations, the slidable portion of the adjustable stand may be capable of moving across the rear surface of the computing device while the dock of the adjustable stand and the port of the mobile computing device are coupled together.

In addition to operating as a stand, some implementations of the adjustable protective stand assembly can be arranged as a protective cover for a mobile computing device. For example, portions of the adjustable stand can be straightened out to form protective panels that are sized to cover the front and rear surfaces of the mobile computing device. In this configuration, the adjustable stand may protect the mobile computing device from scratches, impacts, and other damage.

In some implementations, the adjustable stand and the mobile computing device are configured to removably couple. In some implementations, the mobile computing device and the adjustable stand are coupled in a non-user removable manner. Although most of the examples herein describe magnetically susceptible regions of a rear surface of the mobile computing device, other embodiments are possible too. For example, a case, panel, or another type of structure may be removable coupled to the rear surface of the mobile computing device.

Figure 2:
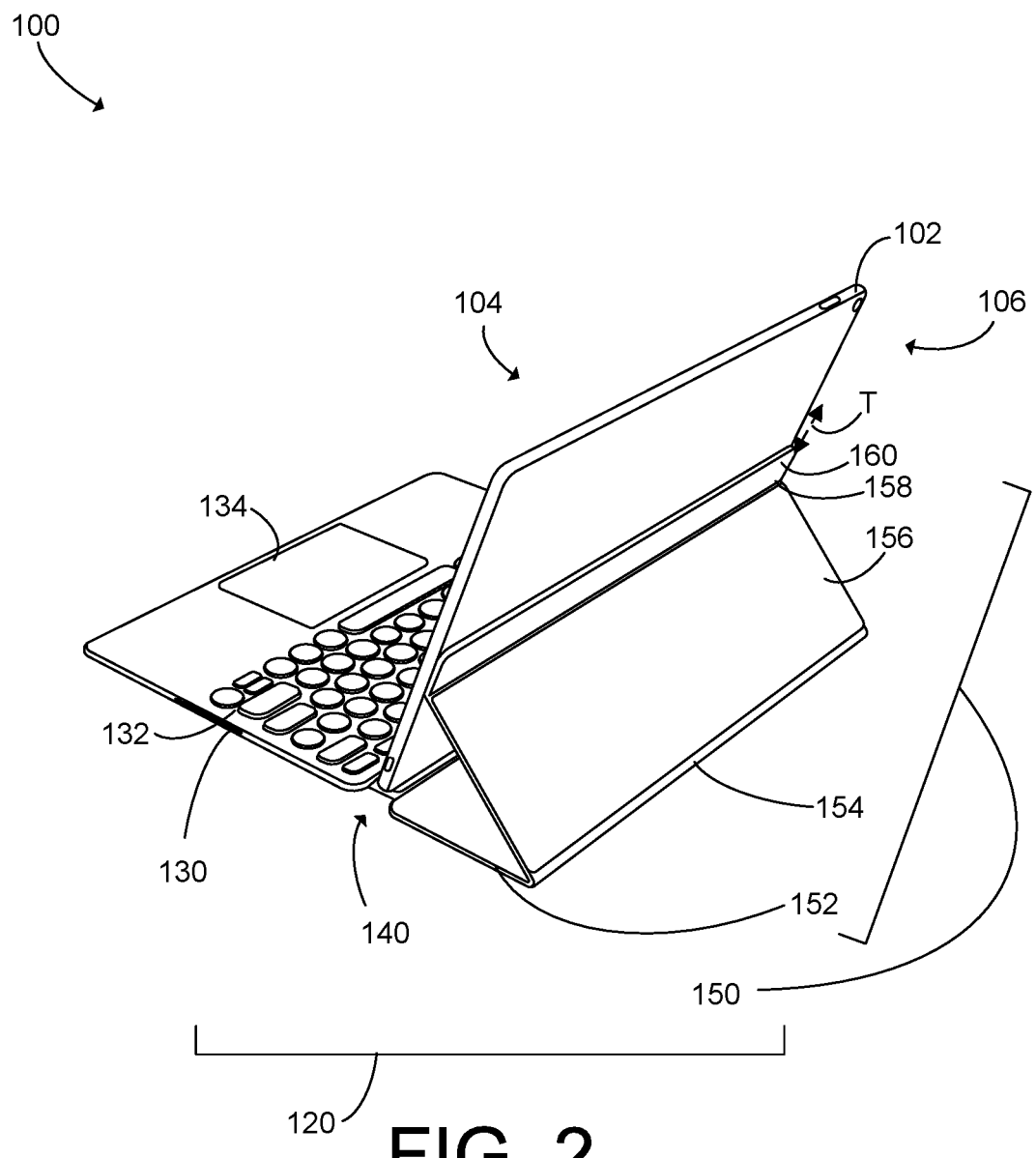
FIG. 2 is a schematic diagram of a back view of an embodiment of the system of FIG. 1.

FIGS. 1 and 2 are schematic diagrams of an embodiment of a system 100 that includes a mobile computing device 102 and adjustable stand 120. FIG. 1 shows an angled view of the front of the system 100, and FIG. 2 shows an angled view of the back of the system 100. In these figures, the system 100 is shown in an example open configuration (e.g., laptop configuration) in which the mobile computing device 102 is propped up for viewing by the adjustable stand 120 and the adjustable stand 120 is arranged in a configuration to receive user inputs.

In some implementations, the mobile computing device 102 may be a mobile phone, such as a smart phone, a tablet, an e-reader, or another type of mobile computing device. The adjustable stand 120 may provide protection for some or all of the mobile computing device 102. Additionally, the adjustable stand 120 may be configured to support or prop up the mobile computing device 102 in various orientations or positions. For example, the adjustable stand 120 may be adjustable between various configurations that position the mobile computing device 102 at viewing angles between, for example, 100 degrees and 145 degrees (e.g., with respect to the surface below the mobile computing device 102). Some implementations may provide different ranges of viewing angles. For example, some implementations may have viewing angles of greater than 90 degrees, greater than 95 degrees, greater than 100 degrees, greater than 105 degrees, or greater than 110 degrees that are adjustable to viewing angles up to 130 degrees, up to 135 degrees, up to 140 degrees, up to 145 degrees, up to 150 degrees, or up to 155 degrees. These ranges are, of course, just examples and other implementations are possible too.

In some implementations, the adjustable stand 120 is configured to removably couple to the mobile computing device 102. The adjustable stand 120 may also include one or more input devices for mobile computing device 102, such as a keyboard or a trackpad. In some implementations, the adjustable stand 120 selectively enables one or more input devices based on the configuration of the adjustable stand 120.

In some implementations, the mobile computing device 102 includes a front surface 104 and a rear surface 106. The front surface 104 may include a display 108. The display 108 may be configured to present text, graphical, and other content. The display 108 may be, for example, a TFT LCD (Thin-Film-Transistor Liquid Crystal Display) or an OLED (Organic Light Emitting Diode) display, or another display technology. The display 108 may include a touch-sensitive surface for receiving touch inputs from a user.

In some implementations, the adjustable stand 120 includes a base panel 130 and an adjustable panel 150 connected by a hinge assembly 140. In some implementations, the base panel 130 is a thin sheet formed from a rigid or substantially rigid material. For example, the base panel may be formed from a thin sheet of fiberglass material that is covered with a cloth or cloth-like material.

In some implementations, the base panel includes one or more user input devices and may be thicker than a thin sheet of material to accommodate the user input devices and electronic circuitry associated with the user input devices. In this example, the base panel 130 includes two user input devices. Specifically, the base panel 130 includes a keyboard 132 and a trackpad 134. The keyboard 132 and the trackpad 134 may communicate via a wireless or wired communication channel.

The hinge assembly 140 joins the base panel 130 to the adjustable panel 150. In some implementations, the hinge assembly 140 adjustably joins the base panel 130 to the adjustable panel 150. The hinge assembly 140 may include a flexible piece of cloth that is sized to wrap around an edge of the mobile computing device 102 (e.g., as illustrated and described with respect to at least FIGS. 4A and 4B). For example, the hinge assembly 140 may have a dimension that is equal to or approximately equal to the thickness of the mobile computing device 102. In some implementations, the hinge assembly 140 is sized to allow the base panel 130 to cover the front surface 104 of the mobile computing device 102 at the same time as the adjustable panel 150 is covering the rear surface 106 of the mobile computing device 102 (e.g., as illustrated and described with respect to at least FIG. 3).

In some implementations, the hinge assembly 140 includes a dock 142 that is configured to mate with a port on the mobile computing device 102. The dock 142 may include a circuit that is configured to communicate data and power between the adjustable stand 120 and the mobile computing device 102. For example, the dock 142 may transmit data representing keystrokes received via the keyboard 132 or pointing inputs received via the trackpad 134. Additionally, the dock 142 may receive power from the mobile computing device 102 to, for example, activate light emitting diodes on the adjustable stand 120 (e.g., to illuminate keys on the keyboard, to indicate power levels, or to provide other information).

In at least some configurations of the adjustable stand 120, the base panel 130 is positioned adjacent to the front surface 104 of the mobile computing device and operates as a protective cover for the front surface 104, including the display 108. In some implementations, the base panel 130 is sized to cover the front surface 104 of the mobile computing device 102. For example, the base panel 130 may be the same size (e.g., surface area, area or footprint profile) as or substantially the same size as the front surface 104.

In some implementations, the adjustable panel 150 may be adjustable to different configurations that alter the position or orientation of the mobile computing device 102. In this example, the adjustable panel 150 includes a base portion 152, a rotatable portion 156, and a slidable portion 160. The base portion 152 may be rotatably connected to the rotatable portion 156 via a first flexible region 154. The first flexible region 154 may allow for adjustment of the angle between the base portion 152 and the rotatable portion 156. Similarly, the slidable portion 160 may be rotatably connected to the rotatable portion 156 via a second flexible region 158. The second flexible region 158 may allow for adjustment of the angle between the rotatable portion 156 and the slidable portion 160.

In some implementations, the adjustable panel 150 is formed from one or more sheets (e.g., thin sheets) of a rigid or substantially rigid materials. For example, the adjustable panel 150 panel may be formed from one or more thin sheets of fiberglass material that are covered with cloth materials. For example, the base portion 152, the rotatable portion 156, and the slidable portion 160 may each be formed from separate sheets of rigid material. These separate sheets of rigid material may be surrounded by and joined by a flexible material such as cloth. The first flexible region 154 and the second flexible region 158 may correspond to junctures between separate sheets of rigid material (e.g., where the flexible material joins the separate sheets of rigid materials).

In at least some configurations of the adjustable stand 120, the adjustable panel 150 is positioned adjacent to the rear surface 106 of the mobile computing device and operates as a protective cover for the rear surface 106. Adjacent to the rear surface may, for example, include the adjustable panel 150 being substantially parallel to the rear surface 106 and in contact with the rear surface. For example, when the adjustable panel 150 is straightened out (e.g., the first flexible region 154 and the second flexible region 158 are flat or approximately flat) the adjustable panel 150 may cover all or most of the rear surface 106 of the mobile computing device 102. In some implementations, the adjustable panel 150 is sized to cover the rear surface 106. For example, the adjustable panel 150 may be the same size (e.g., surface area, area or footprint profile) as or substantially the same size as the rear surface 106.

The slidable portion 160 may be configured to slide along a portion of the rear surface 106 of the mobile computing device 102. Additionally, the slidable portion 160 may be physically attracted to the rear surface 106 of the mobile computing device 102. For example, the slidable portion 160 may be magnetically attracted to at least a portion of the rear surface 106. For example, the slidable portion 160 may include a magnetic material and the rear surface 106 may include one or more magnetically susceptible regions. The magnetically susceptible regions of the rear surface 106 may be formed from magnetically susceptible materials. In some implementations, the magnetically susceptible regions of the rear surface 106 are not formed from magnetically susceptible materials but are instead in close proximity to magnetically susceptible materials. For example, the rear surface 106 may be formed from a magnetically inert material (e.g., a polymer or non-magnetic metal) but a magnetically susceptible material may be disposed inside the mobile computing device 102 near or adjacent to the rear surface 106. Adjacent to the rear surface 106 includes in contact with the material that forms the rear surface 106. In some implementations, the magnetically susceptible region is near to the rear surface 106 when it is disposed inside the mobile computing device at a position so as to be attracted to a magnetic material positioned outside of the mobile computing device 102 on the rear surface 106.

A magnetic material may be a material that produces a magnetic field. For example, a magnetic material may produce a magnetic field independent of any contemporaneous external magnetic field. In some implementations, an external magnetic field is applied during the formation of a magnetic material and then the magnetic field of the magnetic material persists after removal of the external magnetic material. Magnetic materials may produce magnetic fields having a field strength of at least 5 gausses. The magnetic moments of the electrons of a magnetic material may be substantially coordinated so that the magnetic moments point in the same direction.

A ferromagnetic material may be a material having a high susceptibility to magnetization. Some ferromagnetic materials may also be magnetic materials. For example, a ferromagnetic material may form a magnetic material or may be attracted to a magnetic material. Examples of ferromagnetic materials include, but are not limited to, iron, nickel, cobalt and most alloys of these metals. Other examples of ferromagnetic materials include rare earth magnets such as neodymium magnets and samarium-cobalt magnets.

A magnetically susceptible material is a material that is attracted to a magnetic material. Magnetically susceptible materials include magnetic materials and ferromagnetic materials.

In various implementations, various combinations of magnetically susceptible materials are included in the slidable portion 160 and the magnetically susceptible regions of the rear surface 106. In some implementations, both the slidable portion 160 and the magnetically susceptible regions of the rear surface 106 include magnetic materials. In some implementations, the slidable portion 160 includes a magnetic material and the magnetically susceptible regions of the rear surface 106 are formed using ferromagnetic materials. In some implementations, the slidable portion 160 includes a ferromagnetic material and the magnetically susceptible regions of the rear surface 106 are formed using magnetic materials. Additionally, the magnetically susceptible regions of the rear surface 106 may be formed using combinations of ferromagnetic materials and magnetic materials. Similarly, the slidable portion 160 may be formed using combinations of ferromagnetic materials and magnetic materials.

In at least some implementations, the slidable portion 160 may slide (e.g., move) along a region of the rear surface 106.

For example, the slidable portion 160 may slide along a translational axis in a translational direction (indicated at T in this figure) through a first magnetically susceptible region of the rear surface 106. For purposes of this description, the sliding along the translational axis will be described from a point of view of view looking at the front surface 104 when the mobile computing device 102 is in a landscape orientation (i.e., the mobile computing device 102 so that the larger dimension of the display is oriented horizontally). It should be understood, however, that implementations are possible in which the translational axis is different or the mobile computing device 102 is oriented differently. The translational axis may for, example, be aligned with a vertical axis of the mobile computing device 102 when the mobile computing device 102 in in a landscape orientation. A first translational direction may be directed from a bottom side (i.e., the side below the display 108) of the mobile computing device to a top side (i.e., the side above the display 108) of the mobile computing device, and a second translation direction may be directed in the opposite direction (i.e., from the top of the mobile computing device 102 to the bottom).

For example, the first magnetically susceptible region of the rear surface 106 may extend from a lower position on the rear surface 106 to a higher position on the rear surface 106. The slidable portion 160 may then slide between the bottom and the top of the rear surface 106 and may be positioned at the bottom, the top, or anywhere in between. As the slidable portion 160 moves in the translation direction along the rear surface 106, the rotatable portion 156 will rotate with respect to the base portion 152 as will the mobile computing device 102. In this manner, a user can adjust the viewing angle of the display 108. For example, as the slidable portion 160 moves down toward the bottom of the rear surface 106, the mobile computing device 102 rotates to a more upright angle. Conversely, as the slidable portion 160 moves up toward the top of the rear surface 106, the mobile computing device 102 rotates to a more horizontal angle. Because the slidable portion 160 can be adjusted to countless positions within the first magnetically susceptible region, the mobile computing device 102 can be rotated to countless angles. For example, the adjustable stand 120 may allow for infinite adjustment to the angle of the mobile computing device 102.

Figure 3:
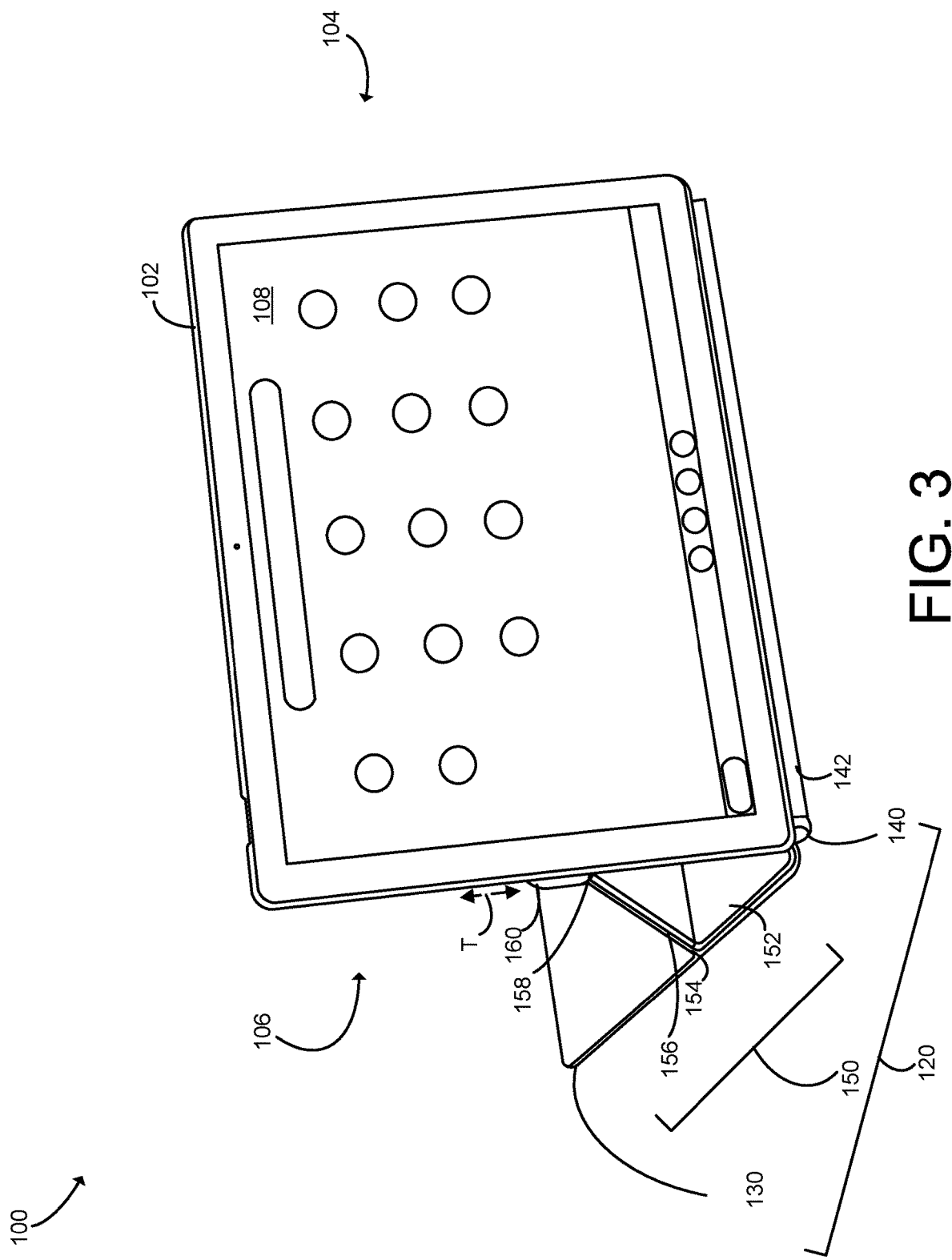
FIG. 3 is a schematic diagram of an embodiment of the system of FIG. 1 in an example viewing configuration.

FIG. 3 is a schematic diagram of the system 100 in an example viewing configuration (also can be referred to as an easel or entertainment configuration). In this example viewing configuration, the base panel 130 is folded under the adjustable panel 150. For example, the hinge assembly 140 may be folded or rotated such that the base panel 130 is at an angle of 180 degrees or approximately 180 degrees with respect to the base portion 152 of the adjustable panel 150.

In at least some embodiments, when the system 100 is arranged in the example viewing configuration shown in FIG. 3, some or all of the user input devices (e.g., the keyboard 132 or the trackpad 134) may be directed downward where they will be unusable and may be in contact with a surface upon which the system 100 is placed (e.g., a desk, table, floor). The user input devices may be disabled based on the system 100 determining that the system 100 is arranged in the example viewing configuration. Some implementations disable input from one or more of the user input devices based on various factors, such as flexure or angle of the hinge assembly 140, orientation of the base panel 130 (e.g., as determined with an accelerometer included in some implementations), and proximity to other components of the adjustable stand 120 (e.g., as determined with a proximity sensor included in some implementations).

Figure 4A:
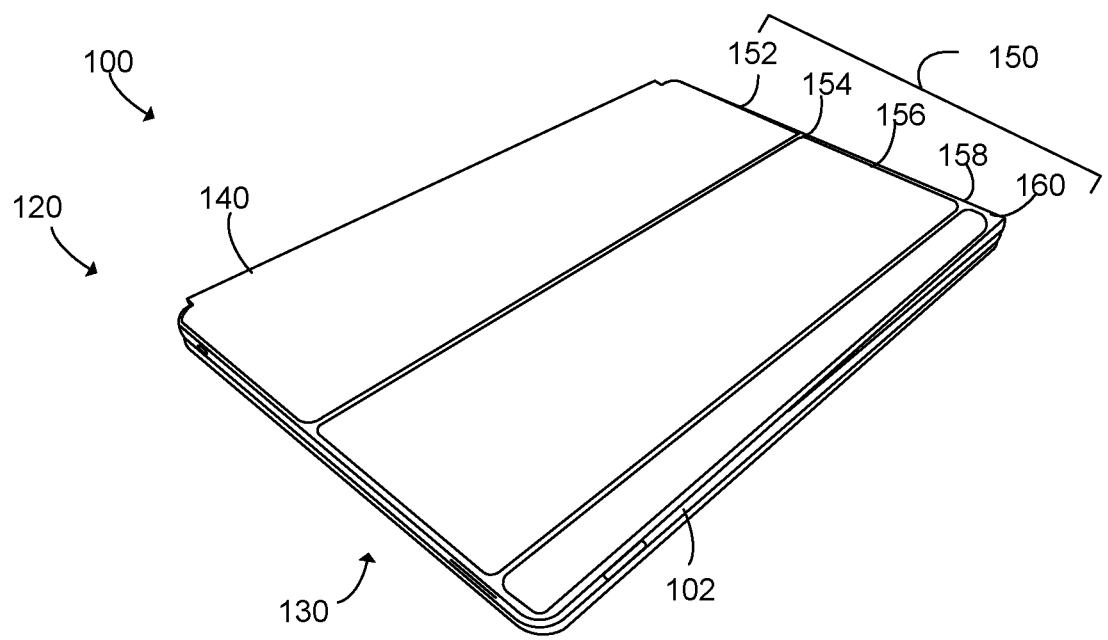
FIGS. 4A and 4B are schematic diagrams of an embodiment of the system of FIG. 1 in an example closed configuration.
Figure 4B:
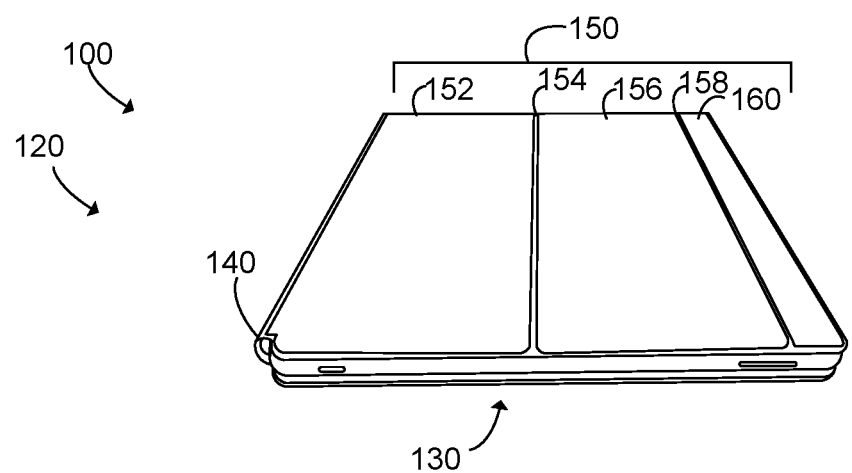

Like in the configuration shown in FIGS. 1 and 2, in the viewing configuration shown in FIG. 3, the angle of the mobile computing device 102 with respect to the surface beneath the system 100 may be adjusted by sliding the slidable portion along the rear surface 106 of the mobile computing device 102. The slidable portion 160 may slide along the rear surface 106 along the translational dimension T to alter the angle of the mobile computing device 102. FIGS. 4A and 4B are schematic diagrams of the system 100 in an example closed configuration. FIG. 4A shows an angled view of the system 100. FIG. 4B shows a side view of the system 100. In this example, the adjustable stand 120 is arranged to cover the front surface 104 and the rear surface 106 of the mobile computing device 102. Specifically, the base panel 130 covers the front surface 104, the adjustable panel 150 covers the rear surface 106, and the hinge assembly 140 wraps around a side of the mobile computing device 102. For example, the adjustable panel 150 may be flattened out (i.e., arranged such that the base portion 152, rotatable portion 156, and the slidable portion 160 may be oriented on or substantially on the same plane). For example, when the adjustable panel 150 is flattened out, the first flexible region 154 and the second flexible region 158 may be straight or approximately straight (i.e., not bent, flexed, or rotated).

In this manner, the adjustable stand 120 may provide protection to the mobile computing device 102. Additionally, the system 100 is arranged to reduce the amount space it takes up. For example, in the closed configuration, the system 100 may be sized to fit easily into a bag, briefcase, backpack, or carried under an arm.

In some implementations, the dock 142 of the hinge assembly 140 is coupled to a port on the mobile computing device 102. For example, the dock 142 may be coupled to a port on the side of the mobile computing device 102 around which the hinge assembly 140 wraps. The hinge assembly 140 may wrap around a side of the mobile computing device that would be located below the display 108 when the mobile computing device 102 was used in a landscape orientation.

Figure 5:
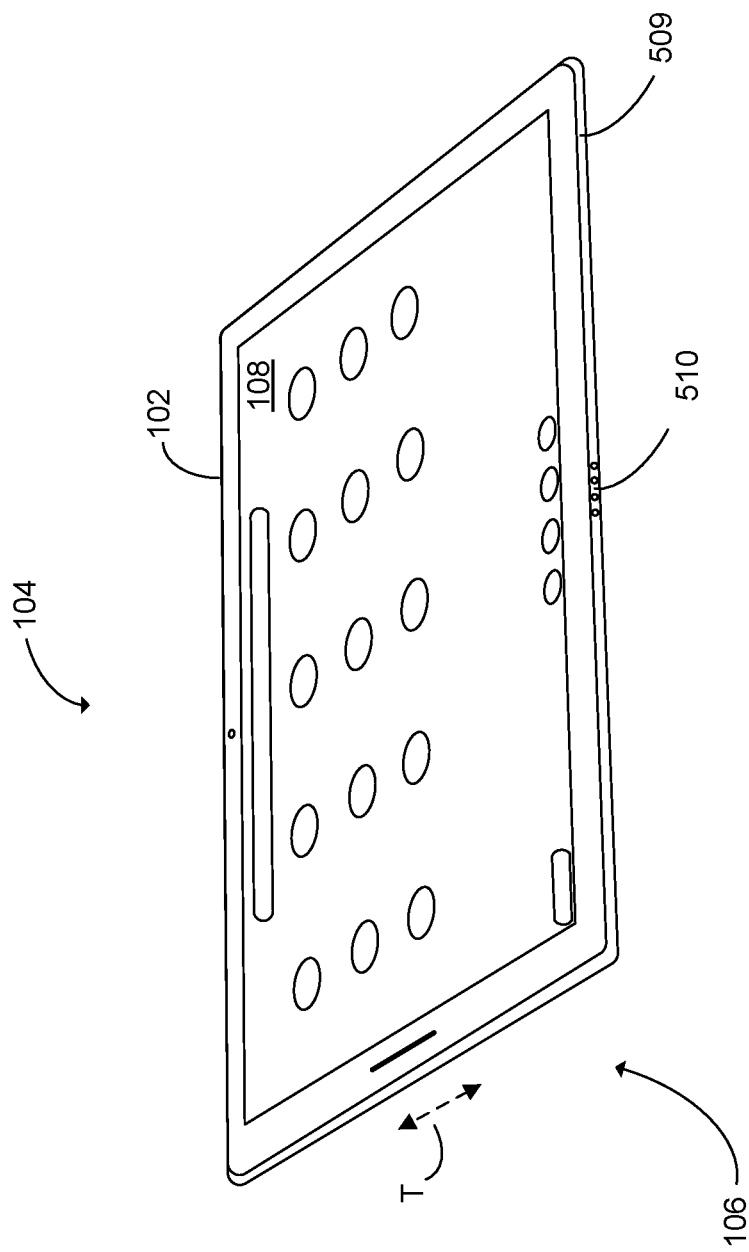
FIG. 5 is a schematic diagram of an embodiment of the mobile computing device of FIG. 1.

FIG. 5 is a schematic diagram of an embodiment of the mobile computing device 102. In this figure, the mobile computing device 102 is shown without the adjustable stand 120. In at least some implementations, the adjustable stand 120 is configured to be separated from the mobile computing device 102 by a user.

As described above, the mobile computing device 102 includes the front surface 104 and the rear surface 106. The front surface 104 includes the display 108. In this example, the front surface 104 and the rear surface 106 are generally flat and rectangular shaped. In some implementations, one or more of the front surface 104 and the rear surface 106 may be curved or rounded. Additionally, the corners of the rectangular shaped surfaces may be rounded.

The front surface 104 and the rear surface are joined by the sides of the mobile computing device 102. The sides may be flat, rounded (e.g., to improve aesthetics or comfort), or various combinations thereof. In this example, a side 509 of the mobile computing device 102 is indicated. The side 509 includes a port 510. The side 509 may be referred to as a bottom side due to its location relative to the display 108 when the mobile computing device 102 is being used in a landscape orientation while coupled to an adjustable protective cover assembly. In at least some implementations, the side 509 will be below the display 108 when the mobile computing device 102 is being used in a landscape orientation while propped up by an adjustable protective cover assembly.

As described above, the rear surface 106 may be configured to slidably couple to a slidable portion of an adjustable stand 120. The rear surface 106 may be configured to allow the slidable portion to move along a translational dimension T. In some implementations, the translations dimension is parallel to an axis of the mobile computing device that runs from the side 509 having the port 510 (i.e., a bottom side) to an opposite side (i.e., a top side).

Figure 6:
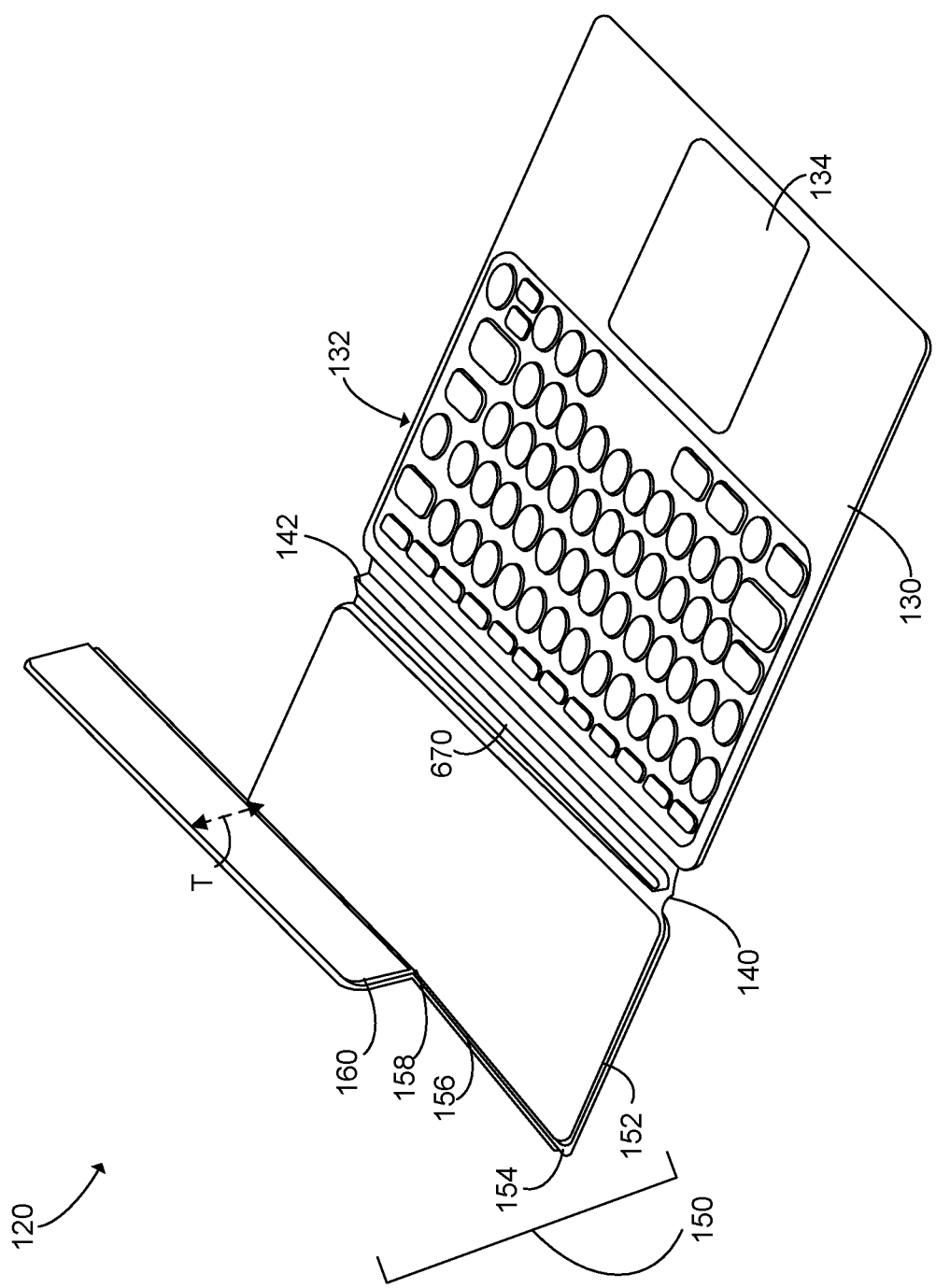
FIG. 6 is a schematic diagram of an embodiment of the adjustable stand of FIG. 1.

FIG. 6 is a schematic diagram of an embodiment of the adjustable stand 120. In this figure, the adjustable stand 120 is shown without the mobile computing device 102. In at least some implementations, the adjustable stand 120 is configured to be separated from the mobile computing device 102 by a user.

In this figure, the adjustable stand 120 is arranged in an open configuration. In some implementations, the open configuration is arranged to adjustably support a mobile computing device. Additionally, in some implementations, the base panel 130 extends out from the hinge assembly 140 in a direction opposite of the direction the base portion 152 of the adjustable panel 150 extends. In the open configuration, the base panel 130 may extend out in front of a front surface of a mobile computing device (i.e., towards a user of the mobile computing device).

As described above, the adjustable stand 120 is adjustable to support a mobile computing device in different angles (i.e., with respect to a surface below the adjustable stand 120). The angle of the mobile computing device 102 can be adjusted by moving the slidable portion 160 along a translational dimension T on a rear surface of the mobile computing device. The translational dimension T may, for example, be parallel with a short axis of the slidable portion 160. In some implementations, the slidable portion 160 may be movable in a first direction along the translational dimension T (e.g., towards the hinge assembly 140) to position the mobile computing device in a more upright position. Conversely, the slidable portion 160 may be movable in a second direction along the translation dimension T that is opposite the first direction (e.g., is away from the hinge assembly 140) to position the mobile computing device in a less upright position.

In some implementations, the dock 142 may include a connector 670. The connector 670 may be configured to mate with a port of a mobile computing device, such as the port 510 of the mobile computing device 102 (shown in at least FIG. 5). In some implementations, the connector 670 includes circuitry to allow one or more of data or power to be transmitted to from the adjustable stand 120.

Figure 7:
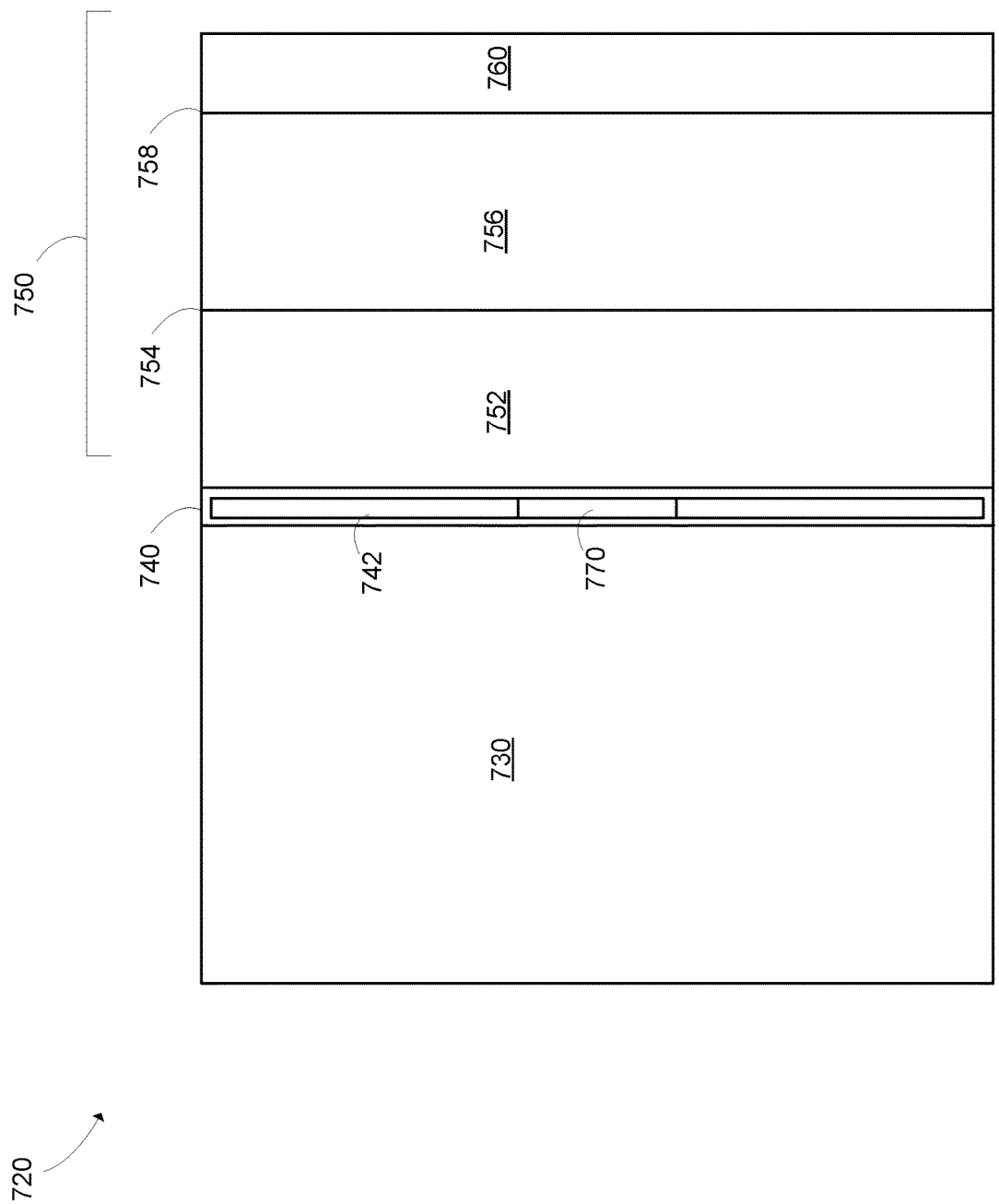
FIG. 7 is a schematic diagram of an embodiment of the adjustable stand of FIG. 1.

FIG. 7 is a schematic diagram of an embodiment of an adjustable stand 720. In this example, the adjustable stand 720 is arranged in a substantially flat configuration and is shown from a top view.

In this example, the adjustable stand 720 includes a base panel 730, a hinge assembly 740, and an adjustable panel 750. The base panel 730, the hinge assembly 740, and the adjustable panel 750 may be similar to the base panel 130, the hinge assembly 140, and the adjustable panel 150 respectively. Although not shown in this figure, the base panel 730 may include one or more user input devices.

The hinge assembly 740 may join the base panel 730 to the adjustable panel 750. In some implementations, the hinge assembly 740 allows the adjustable panel 750 to rotate with respect to the base panel 730. The hinge assembly 740 may include a dock 742. The dock 742 may be rotatably joined to the hinge assembly 740 such that the dock 742 may rotate independently of the rest of the hinge assembly 740. The dock 742 may be configured to fit against a side of a mobile computing device, such as a bottom side (i.e., a side between the front surface and the rear surface that is located below the display when the mobile computing device is being used in a landscape orientation). The dock 742 may include a connector 770 for connecting with a port of the mobile computing device. In some implementations, the connector 770 is configured to electronically connect, mechanically connect, or both with the port of the mobile computing device. For example, the connector 770 may include pins or other mechanical structures for coupling to the port of the mobile computing device 102.

In this example, the adjustable panel 750 includes a base portion 752, a rotatable portion 756, and a slidable portion 760. The base portion 752 may be rotatably coupled to the rotatable portion 756 by a first flexible region 754, and the rotatable portion 756 may be rotatably connected to the slidable portion 760 by a second flexible region 758. The base portion 752, the rotatable portion 756, and the slidable portion 760 may be similar to the previously described base portion 152, the rotatable portion 156, and the slidable portion 160. In some implementations, the length of the long axes of the base portion 752, rotatable portion 756, and slidable portion 760 may be the same. In some implementations, the length of the long axes of one or more of the base portion 752, rotatable portion 756, and slidable portion 760 may be the same as or substantially the same as the length of the long axis of the axis of a mobile computing device (e.g., the long axis of a mobile computing device may be the width of the computing device when used in a landscape orientation). Substantially the same length may include lengths that are within 1% of each other, lengths that are within 2% of each other, or lengths that are within 5% of each other.

In some implementations, the length of the short axes of the base portion 752 and the rotatable portion 756 may be greater than the length of the short axis of the slidable portion 760. For example, the length of the short axis of the slidable portion 760 may be approximately 25% of the length of the short axis of the rotatable portion 756. In some implementations, the lengths of the short axes of the base portion 752 and the rotatable portion 756 may be the same. In some implementations, the lengths of the short axes of the base portion 752 and the rotatable portion 756 are within 25% of one another.

Figure 8:
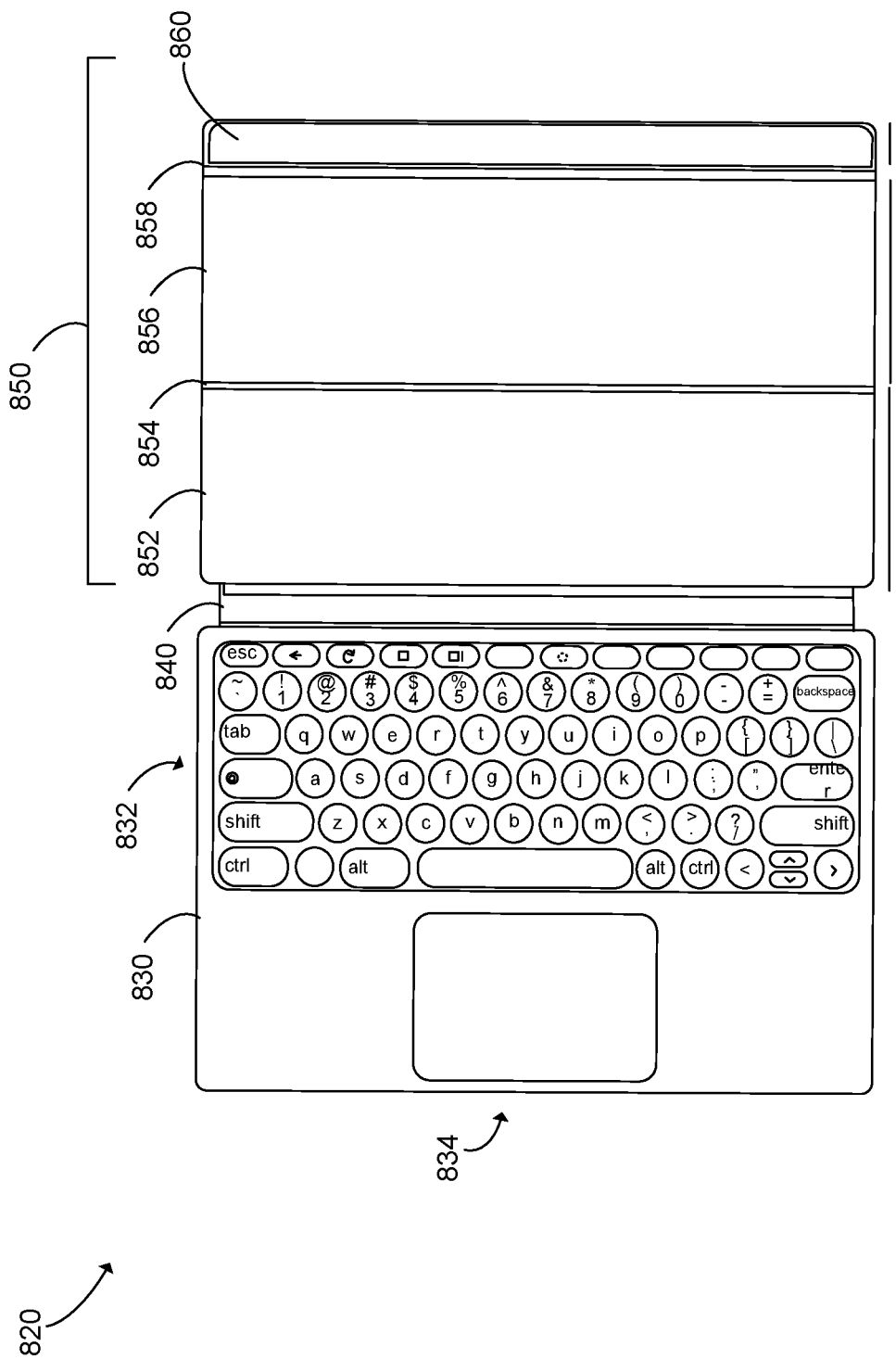
FIG. 8 is a schematic diagram of an embodiment of the adjustable stand of FIG. 1.

FIG. 8 is a schematic diagram of an embodiment of an adjustable stand 820. In this example, the adjustable stand 820 is arranged in a substantially flat configuration and is shown from a top view.

In this example, the adjustable stand 820 includes a base panel 830, a hinge assembly 840, and an adjustable panel 850. The base panel 830, the hinge assembly 840, and the adjustable panel 850 may be similar to the base panel 130, the hinge assembly 140, and the adjustable panel 150 respectively. In this example, the base panel 830 includes two user input devices: a keyboard 832 and a trackpad 834. The keyboard 832 may include various types of keys. In some implementations, the keyboard 832 includes a plurality of round keys, such as circular keys, substantially circular keys, and oval keys. In some implementations, the keys of the keyboard 832 have a travel of between 1-2 millimeters, such as a travel of 1.4 millimeters. In some implementations, the travel of a key refers to how far the key moves when being pressed.

The hinge assembly 840 may join the base panel 830 to the adjustable panel 850. In some implementations, the hinge assembly 840 allows the adjustable panel 850 to rotate with respect to the base panel 830. The hinge assembly 840 may be similar to the previously described hinge assembly 140.

In this example, the adjustable panel 850 includes a base portion 852, a rotatable portion 856, and a slidable portion 860. The base portion 852 may be rotatably coupled to the rotatable portion 856 by a first flexible region 854, and the rotatable portion 856 may be rotatably connected to the slidable portion 860 by a second flexible region 858. The base portion 852, the rotatable portion 856, and the slidable portion 860 may be similar to the previously described base portion 152, the rotatable portion 156, and the slidable portion 160.

Figure 9:
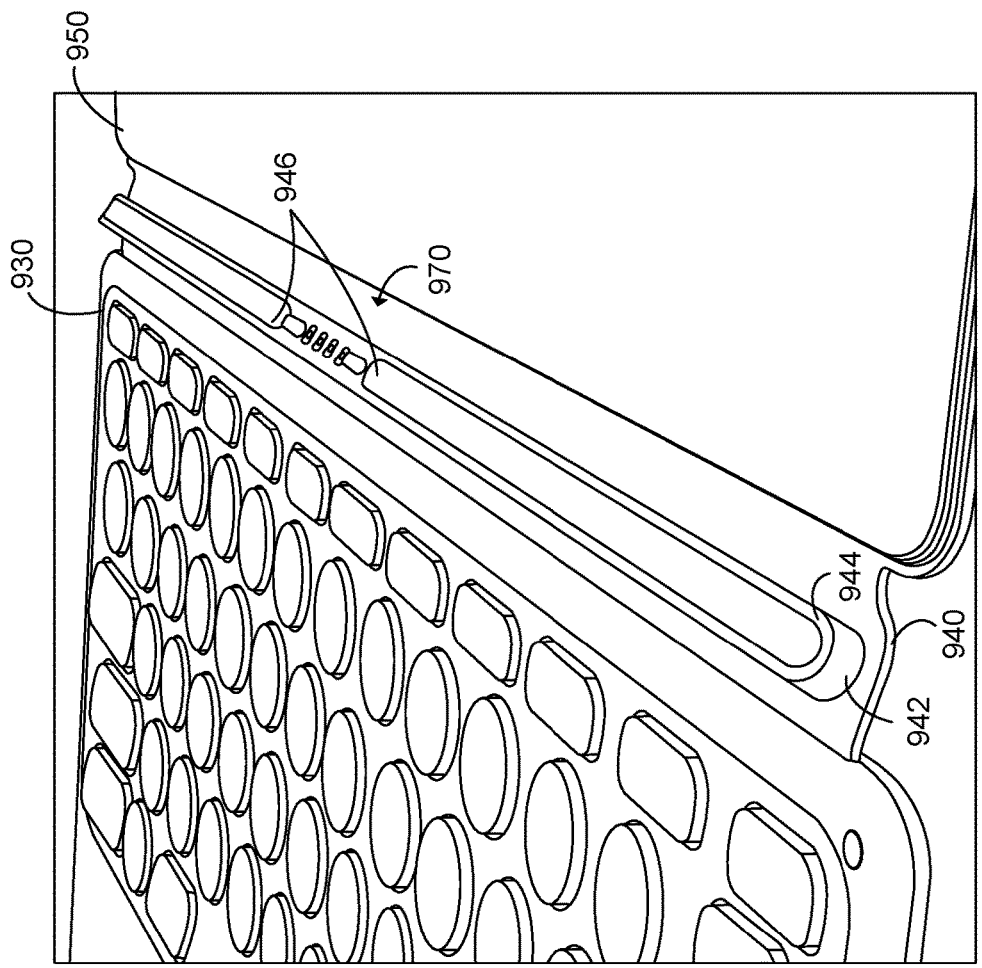
FIG. 9 is a schematic diagram of a portion of an embodiment of the adjustable stand of FIG. 1.

FIG. 9 is a schematic diagram of a portion of an embodiment of an adjustable stand 920. The adjustable stand 920 is an example of the adjustable stand 120. In this figure, a close-up view of a hinge assembly 940 of the adjustable stand 920 is shown. The adjustable stand 920 also includes a base panel 930 and an adjustable panel 950. The hinge assembly 940 flexibly connects the base panel 930 to the adjustable panel 950, allowing one or both of the position and orientation of the adjustable panel 950 to be adjusted with respect to the base panel 930. The hinge assembly 940 may, for example, be formed from a thin sheet of flexible material, such as a cloth, rubber, or a polymer.

The hinge assembly 940 includes a dock 942. The dock 942 is configured to mate with a side of a mobile computing device, such as the mobile computing device 102. For example, the dock 942 may be configured to mate with a side of a mobile computing device, such as a bottom side (i.e., a side between the front surface and the rear surface that is located below the display when the mobile computing device is being used in a landscape orientation). In some implementations, the dock 942 may be configured to mate with a side of the mobile computing device that has a port.

In some implementations, the dock 942 includes a surface 944. The surface 944 may be sized or shaped to fit against at least a portion of a side of the mobile computing device. For example, the surface 944 may be concave so as to fit against a rounded surface of the side. In some implementations, the dock 942 also includes one or more pad 946. The pad 946 (or pads) may be coupled to the surface 944 and may be formed from a material that is flexible. The pad 946 may also be shaped to fit against a portion of the surface of the side of the mobile computing device. The pad 946 may be configured to dampen any impacts and vibrations between the side of the mobile computing device and the dock 942. The dock 942 may also include a connector 970 for connecting with a port of the mobile computing device.

Figure 10:
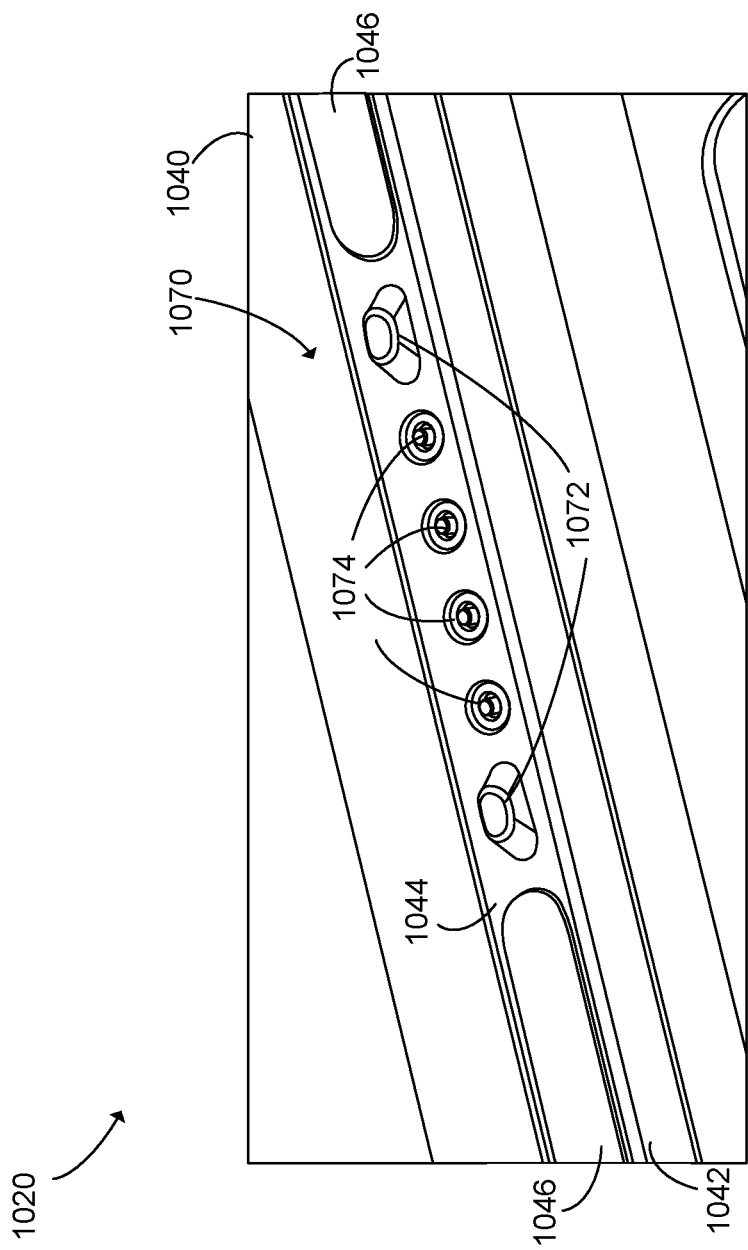
FIG. 10 is a schematic diagram of a portion of an embodiment of an adjustable stand of FIG. 1.

FIG. 10 is a schematic diagram of a portion of an embodiment of an adjustable stand 1020. The adjustable stand 1020 is an example of the adjustable stand 120. This figure shows a close-up view of a connector 1070 of a dock 1042 of a hinge assembly 1040 of the adjustable stand 1020. Also shown is a surface 1044 of the dock 1042 and pads 1046 of the dock 1042. The surface 1044 and the pads 1046 may be similar to the previously described surface 944 and pads 946 respectively.

In some implementations, the connector 1070 provides an electronic connection between the adjustable stand 1020 and a mobile computing device, such as the mobile computing device 102. The connector 1070, for example, may be configured to removably connect to a port on the mobile computing device. The connector 1070 may also be configured to mechanically connect to the mobile computing device.

In some implementations, the connector 1070 includes alignment pins 1072 and electronic contacts 1074. The alignment pins 1072 may, for example, be configured to fit into corresponding recesses in a side of the mobile computing device. When the alignment pins 1072 are aligned with the corresponding recesses, the electronic contact 1074 may also be properly aligned with corresponding contacts on the port of the mobile computing device.

The electronic contacts 1074 form an electronic connection when in physical contact with corresponding contacts on a port of the mobile computing device. When the electrical connection is formed, data may be transmitted between the mobile computing device and the adjustable stand 1020. In some implementations, the electronic contacts 1074 include spring-loaded electronic contact pins (which are also sometimes referred to as POGO pins). This example includes four electronic contacts 1074 but other numbers of electronic contacts are possible too.

Figure 11:
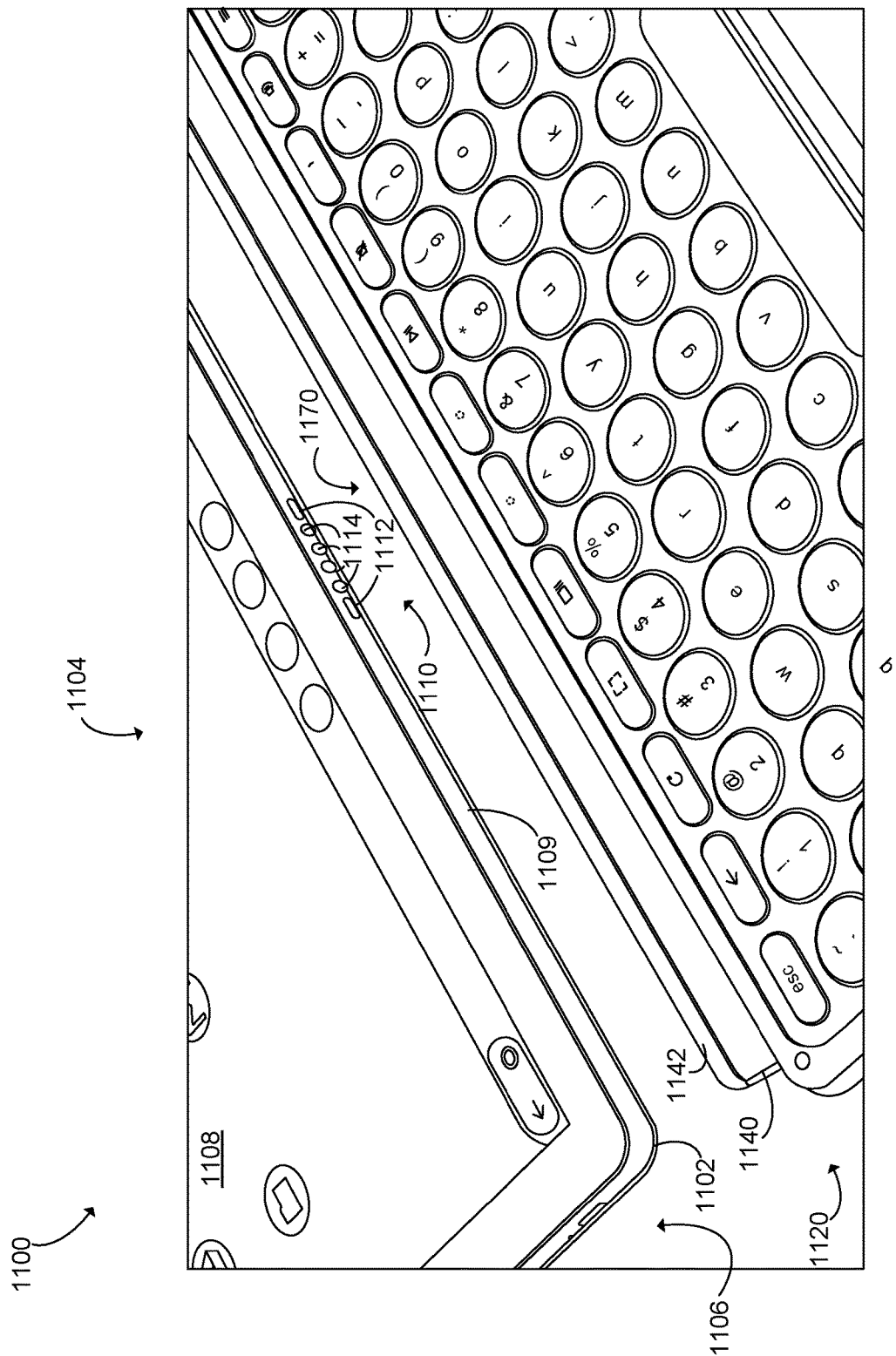
FIG. 11 is a schematic diagram of a portion of an embodiment of the system of FIG. 1.

FIG. 11 is a schematic diagram of a portion of an example system 1100 that includes a mobile computing device 1102 and an adjustable stand 1120. In this figure, a close-up view of the interface between the mobile computing device 1102 and the adjustable stand 1120 is shown. The mobile computing device 1102 is an example of the mobile computing device 102 and the adjustable stand 1120 is an example of the adjustable stand 120.

The mobile computing device 1102 includes a port 1110. The port 1110 is disposed on a side 1109 of the mobile computing device 1102. The side 1109 is between the front side 1104 (containing the display 1108) and the rear surface 1106 of the mobile computing device 1102. In this case, the side 1109 is disposed below the display 1108 (i.e., from the perspective of one viewing the display 1108).

In some embodiments, the port 1110 includes at least one alignment recess 1112 and at least one electronic contact 1114. In this example, the port 1110 includes two alignment recesses 1112 and four electronic contacts 1114. The alignment recesses 1112 may be configured to receive alignment pins of a connector 1170 located on a dock 1142 of a hinge 1140 of the adjustable stand 1120 to properly align the electronic contacts 1114 with electronic contacts of the adjustable stand 1120.

Figure 12:
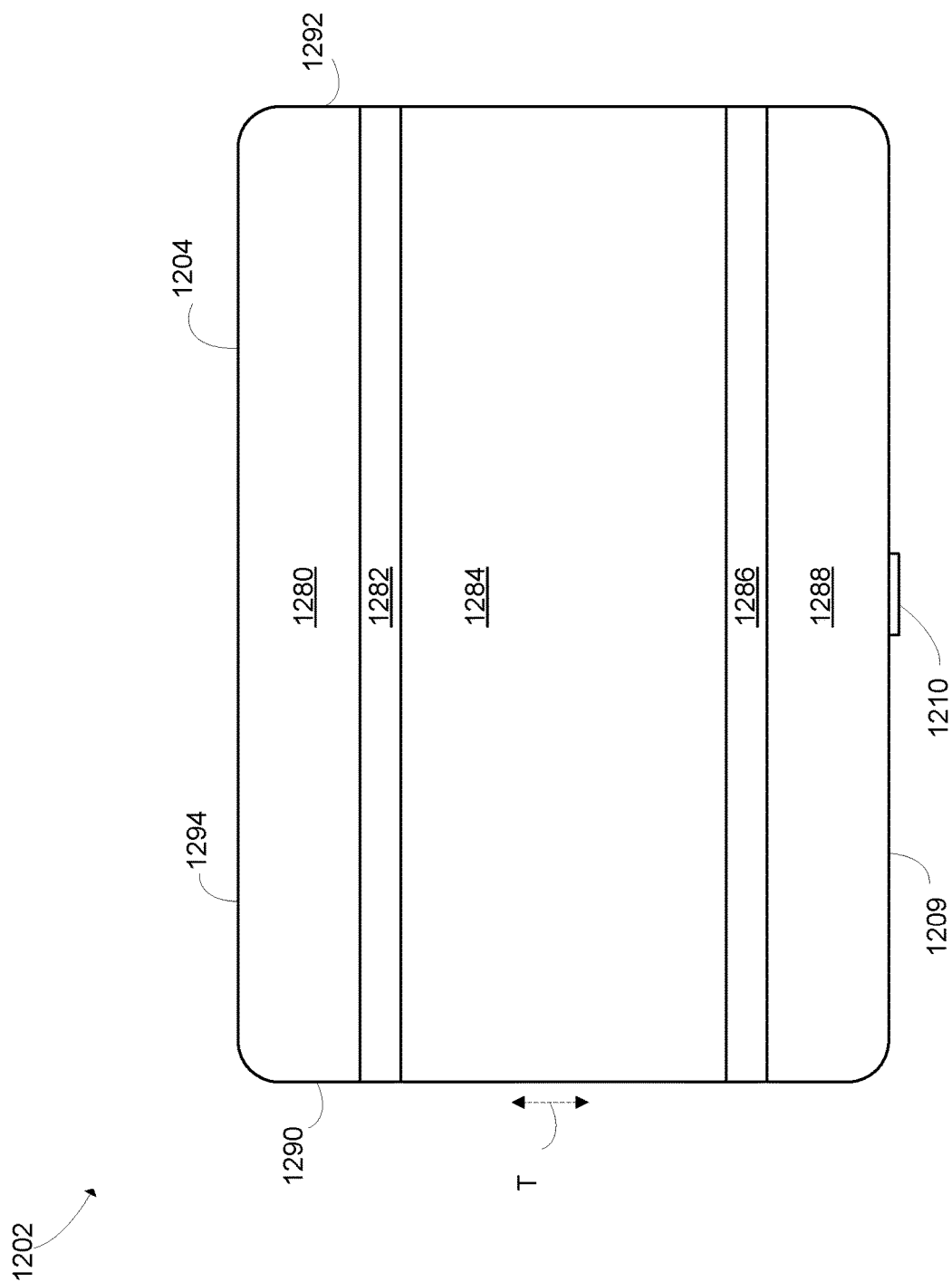
FIG. 12 is a schematic diagram of an embodiment of a rear surface of the mobile computing device of FIG. 1.

FIG. 12 is a schematic diagram of an embodiment of a rear surface 1204 of a mobile computing device 1202. The mobile computing device 1202 is an example of the mobile computing device 102.

The rear surface 1204 may include multiple regions. At least some of these regions may have different magnetic properties than some of the other regions. For example, some of the regions may not be magnetically susceptible (i.e., the regions do not generate magnets and are not attracted to magnetic fields). Some of the regions may be attracted to magnetic fields and some of the regions may generate magnetic fields. In addition, the strength of the attraction to a magnetic field or of the generated magnetic fields may be different in at least some of the magnetic fields. The multiple regions and the magnetic properties of those regions may be configured to alter the way a slidable portion of an adjustable stand (such as the slidable portion 160 of the adjustable stand 120) couples to or slides along the rear surface 1204.

In this example, the rear surface 1204 includes a first non-magnet region 1280, a first magnetically susceptible region 1282, a second magnetically susceptible region 1284, a third magnetically susceptible region 1286, and a second non-magnet region 1288. Other embodiments may include more, fewer, or different regions. Each of the regions may extend longitudinally across the rear surface 1204, starting from a first side 1290 and continuing to a second side 1292 that is opposite the first side 1290.

Here, the first non-magnet region 1280 is disposed near a top side 1294 of the mobile computing device 1202. The first magnetically susceptible region 1282 is disposed next to the first non-magnet region 1280 and separated from the top side 1294 by the first non-magnet region 1280. The second magnetically susceptible region 1284 is disposed next to the first magnetically susceptible region 1282 and separated from the first non-magnet region 1280 by the first magnetically susceptible region 1282. The third magnetically susceptible region 1286 is disposed next to the second magnetically susceptible region 1284 and separated from the first magnetically susceptible region 1282 by the second magnetically susceptible region 1284. The second non-magnet region 1288 is disposed next to the third magnetically susceptible region 1286 and separated from the second magnetically susceptible region 1284 by the third magnetically susceptible region 1286. The second non-magnet region 1288 may also be disposed next to the bottom side 1209. In some implementations, the regions may be ordered, starting from the top side 1294 to the bottom side 1209 as follows: the first non-magnet region 1280, the first magnetically susceptible region 1282, the second magnetically susceptible region 1284, the third magnetically susceptible region 1286, and the second non-magnet region 1288.

In some implementations, the first non-magnet region 1280 and the second non-magnet region 1288 are not magnetically susceptible. For example, the sliding panel may not be attracted to and may not couple (i.e., stay in contact with when external force is removed) to the first non-magnet region 1280 and the second non-magnet region 1288.

The first magnetically susceptible region 1282, the second magnetically susceptible region 1284, and the third magnetically susceptible region 1286 may all be magnetically susceptible in at least some implementations. The sliding panel may be attracted to and may stay in contact with these regions even when an external physical force is removed.

In some implementations, the first magnetically susceptible region 1282 and the third magnetically susceptible region 1286 may be more magnetically susceptible (i.e., attracted more strongly to a magnetic field or generating a stronger magnetic field) than the second magnetically susceptible region 1284. For example, the first magnetically susceptible region 1282 may be more strongly attracted to the sliding panel than the second magnetically susceptible region 1284 is. Similarly, the third magnetically susceptible region 1286 may be more strongly attracted to the sliding panel than the second magnetically susceptible region 1284 is. In this manner, the slidable portion may require less force to slide (or reposition) when it is touching the second magnetically susceptible region 1284 than when it is touching either the first magnetically susceptible region 1282 or the third magnetically susceptible region 1286. In this manner, the first magnetically susceptible region 1282 and the third magnetically susceptible region 1286 may act to stop the sliding motion of the slidable portion when the slidable portion is getting near the ends of the magnetically susceptible regions. For example, the first magnetically susceptible region 1282 and the third magnetically susceptible region 1286 may act as a magnetic detent to the movement of the slidable portion along the translational dimension T.

For example, the slidable portion of an adjustable stand will slide along the translational dimension T through the second magnetically susceptible region 1284. For example, the translational dimension may run between the bottom side 1209 to the top side 1294. In other words, the translation dimension may run from the side of the mobile computing device 1202 that includes the port 1210 to the opposite side of the mobile computing device 1202.

The first magnetically susceptible region 1282, the second magnetically susceptible region 1284, and the third magnetically susceptible region 1286 are example of magnetically susceptible regions of the rear surface 1204. The magnetically susceptible regions of the rear surface 1204 may be formed from magnetically susceptible materials, by positioning magnetically susceptible materials near the regions (e.g., within the mobile computing device 1202 beneath the rear surface 1204 in those regions), or combinations thereof. In some embodiments, magnets are disposed adjacent to the rear surface 1204 in the magnetically susceptible regions.

Figure 13:
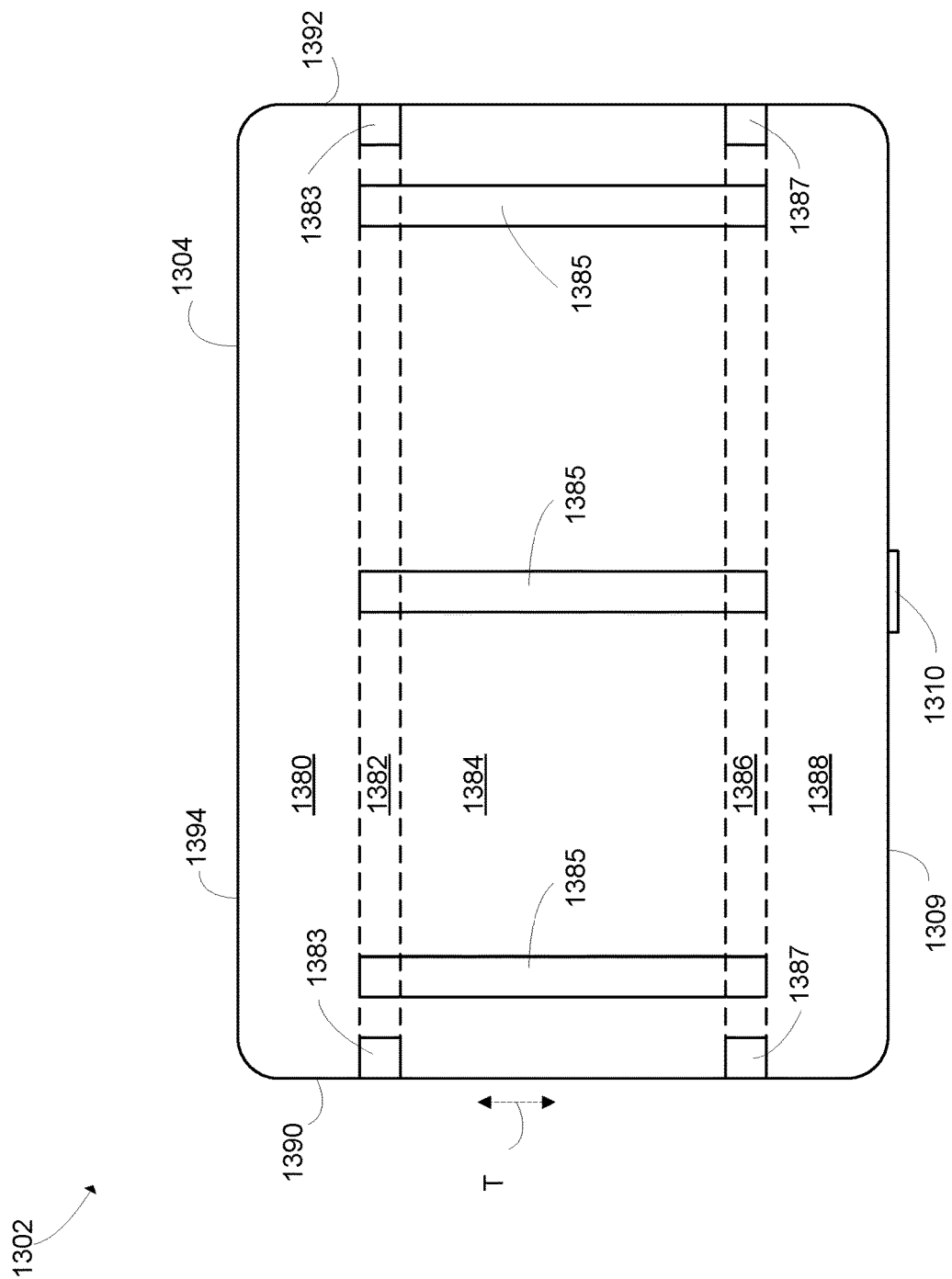
FIG. 13 is a schematic diagram of an embodiment of a rear surface and underlying components of the mobile computing device of FIG. 1.

FIG. 13 is a schematic diagram of an embodiment of a rear surface 1304 of a mobile computing device 1302 and underlying components of the mobile computing device 1302. The mobile computing device 1302 is an example of the mobile computing device 102. The rear surface 1304 may be similar to the rear surface 1204, which has been previously described. In this figure, the magnetic materials beneath the rear surface 1304 are shown with respect to the back the surface.

In this example, the rear surface 1304 includes a first non-magnet region 1380, a first magnetically susceptible region 1382, a second magnetically susceptible region 1384, a third magnetically susceptible region 1386, and a second non-magnet region 1388. Other embodiments may include more, fewer, or different regions. These regions may be similar to the previously described first non-magnet region 1280, first magnetically susceptible region 1282, second magnetically susceptible region 1284, third magnetically susceptible region 1286, and second non-magnet region 1288 that have been previously described. Each of the regions may extend longitudinally across the rear surface 1304, starting from a first side 1390 and continuing to a second side 1392 that is opposite the first side 1390. The regions may be arranged to allow movement along a translation dimension T that is oriented with the short axis of the rear surface 1304 (i.e., from a top side 1394 to a bottom side 1309 that includes a port 1310).

In at least some embodiments, the mobile computing device 1302 includes magnetically susceptible materials 1383, magnetically susceptible materials 1385, and magnetically susceptible materials 1387. In at least some embodiments, the magnetically susceptible materials 1383, magnetically susceptible materials 1385, and magnetically susceptible materials 1387 are disposed beneath the rear surface 1304.

In this example, the magnetically susceptible materials 1385 includes three strips of magnetic material that extends beneath the first magnetically susceptible region 1382, the second magnetically susceptible region 1384, and the third magnetically susceptible region 1386. Other embodiments may include a different number of strips of magnetic material or a different arrangement of magnetic material. In some embodiments, the magnetically susceptible materials 1385 are disposed only beneath the second magnetically susceptible region 1384. The magnetically susceptible materials 1385 are configured to be magnetically attracted to a slidable portion such that the slidable portion remains stationary and in contact with the rear surface 1304 when no external force is applied to the slidable portion. The magnetically susceptible materials 1385 may be formed from magnetic materials, ferromagnetic materials, or a combination of both.

The magnetically susceptible materials 1383 are disposed beneath the rear surface 1304 of the mobile computing device 1302 in the first magnetically susceptible region 1382. In this example, the magnetically susceptible materials 1383 includes two separate portions of magnetically susceptible material (one near the first side 1390 and the other near the second side 1392). The magnetically susceptible materials 1383 may be formed from magnetic materials, ferromagnetic materials, or a combination of both. The magnetically susceptible materials 1383 are used to increase the magnetic susceptibility of the first magnetically susceptible region 1382, causing the first magnetically susceptible region 1382 to have a higher magnetic susceptibility than the second magnetically susceptible region 1384 (e.g., the first magnetically susceptible region 1382 may generate a stronger magnetic field than the second magnetically susceptible region 1384 or the first magnetically susceptible region 1382 may be more attracted to a magnetic field than the second magnetically susceptible region 1384 is). Although shown as two separate portions in this embodiment, other embodiments are possible that include a single portion of material for the magnetically susceptible materials 1383. For example, a single strip of magnetically susceptible material may extend beneath all (or substantially all) of the first magnetically susceptible region 1382. In some implementations, the magnetically susceptible materials 1383 may include or may function as detent magnets.

In some implementations, the magnetically susceptible materials 1383 have a rectangular surface area. The surface of the magnetically susceptible materials 1383 may be sized to match a slidable portion of an adjustable stand. For example, the length of the axis of the magnetically susceptible materials 1383 that is aligned with the short axis of the mobile computing device 1302 may be the same as or substantially the same as the length of the short axis of a slidable portion. In some implementations, the magnetically susceptible materials 1383 includes two portions of magnetic material that are disposed near opposite ends of the long axis of the mobile computing device (e.g., near the first side 1390 and near the second side 1392). In some implementations, one portion of magnetic material of the magnetically susceptible materials 1383 is disposed within the first quadrant of the long axis (i.e., near the first side 1390) and the second portion of magnetic material of the magnetically susceptible materials 1383 is disposed within the last quadrant of the long axis (i.e., near the second side 1392). In at least some of these implementations, positioning the magnetically susceptible materials 1383 in the first and last quadrants may prevent or reduce torsional movement of the slidable panel when it is in contact with the first magnetically susceptible region 1382.

The magnetically susceptible materials 1387 are disposed beneath the rear surface 1304 of the mobile computing device 1302 in the third magnetically susceptible region 1386. In this example, the magnetically susceptible materials 1387 includes two separate portions of magnetically susceptible material (one near the first side 1390 and the other near the second side 1392). The magnetically susceptible materials 1387 may be formed from magnetic materials, ferromagnetic materials, or a combination of both. The magnetically susceptible materials 1387 are used to increase the magnetic susceptibility of the third magnetically susceptible region 1386, causing the third magnetically susceptible region 1386 to have a higher magnetic susceptibility than the second magnetically susceptible region 1384 (e.g., the third magnetically susceptible region 1386 may generate a stronger magnetic field than the second magnetically susceptible region 1384 or the third magnetically susceptible region 1386 may be more attracted to a magnetic field than the second magnetically susceptible region 1384 is). Although shown as two separate portions in this embodiment, other embodiments are possible that include a single portion of material for the magnetically susceptible materials 1387. For example, a single strip of magnetically susceptible material may extend beneath all (or substantially all) of the third magnetically susceptible region 1386. In some implementations, the magnetically susceptible materials 1387 may include or may function as detent magnets.

The magnetically susceptible materials 1387 may be similar to the magnetically susceptible materials 1383 except that the magnetically susceptible materials 1387 are disposed in the third magnetically susceptible region 1386. In some implementations, the magnetically susceptible materials 1387 have a rectangular surface area. The surface of the magnetically susceptible materials 1387 may be sized to match a slidable portion of an adjustable stand. For example, the length of the axis of the magnetically susceptible materials 1387 that is aligned with the short axis of the mobile computing device 1302 may be the same as or substantially the same as the length of the short axis of a slidable portion. In some implementations, the magnetically susceptible materials 1387 includes two portions of magnetic material that are disposed near opposite ends of the long axis of the mobile computing device (e.g., near the first side 1390 and near the second side 1392). In some implementations, one portion of magnetic material of the magnetically susceptible materials 1387 is disposed within the first quadrant of the long axis (i.e., near the first side 1390) and the second portion of magnetic material of the magnetically susceptible materials 1387 is disposed within the last quadrant of the long axis (i.e., near the second side 1392). In at least some of these implementations, positioning the magnetically susceptible materials 1387 in the first and last quadrants may prevent or reduce torsional movement of the slidable panel when it is in contact with the third magnetically susceptible region 1386.

Figure 14:
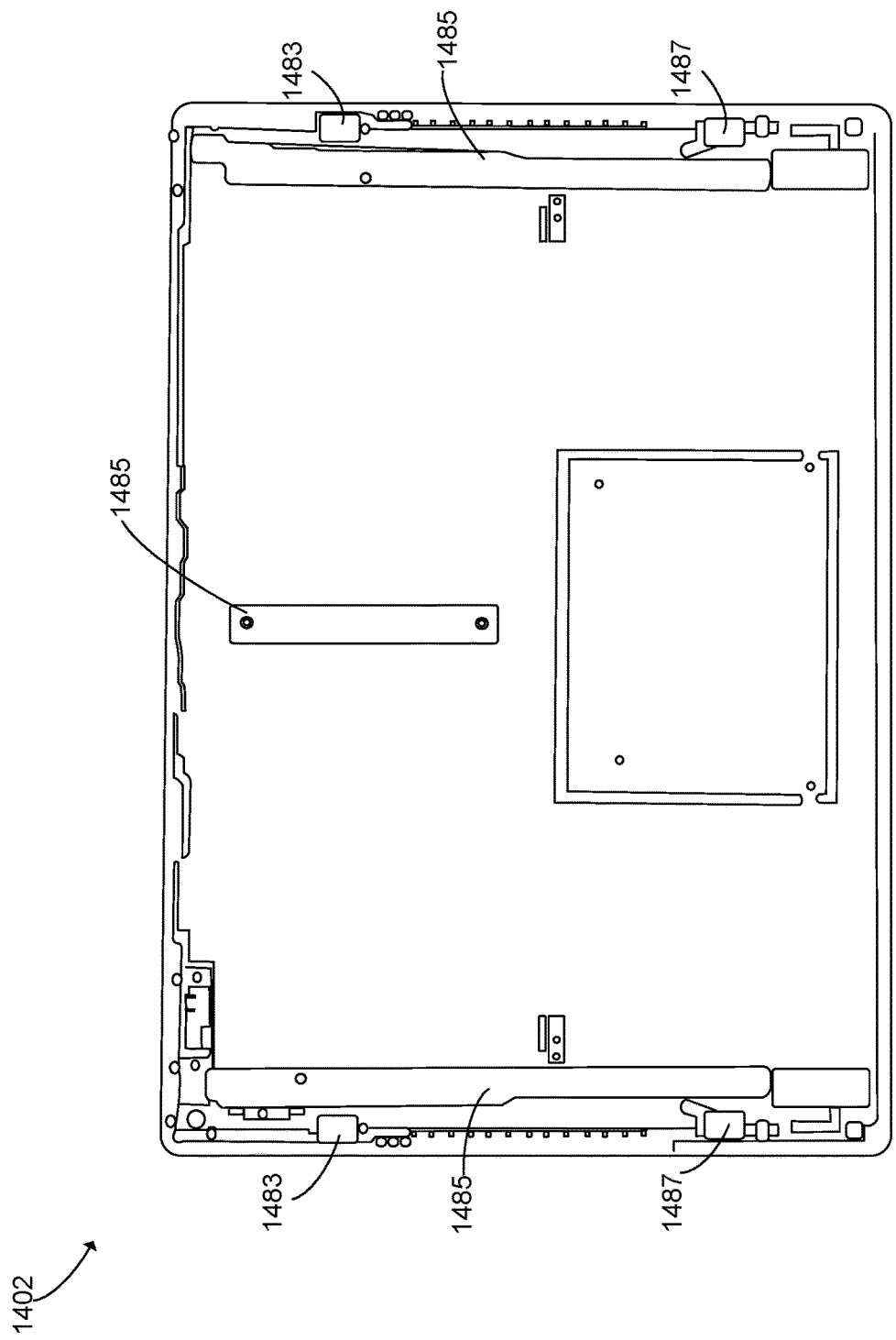
FIG. 14 is a schematic diagram of an embodiment of the mobile computing device of FIG. 1.

FIG. 14 is a schematic diagram of an embodiment of a mobile computing device 1402. In this figure, the rear surface has been removed to show the magnetically susceptible materials beneath the surface. In this example, the mobile computing device 1402 includes magnetically susceptible materials 1483, magnetically susceptible materials 1485, and magnetically susceptible materials 1487, which may be similar to the previously describe magnetically susceptible materials 1383, magnetically susceptible materials 1385, and magnetically susceptible materials 1387 respectively.

FIGS. 15A-15D are schematic diagrams of embodiments of a mobile computing device 1502 and an adjustable stand 1520 in various arrangements that alter the viewing angle of the mobile computing device 1502. The mobile computing device 1502 is an example of the mobile computing device 102, and the adjustable stand 1520 is an example of the adjustable stand 120.

Figure 15A:
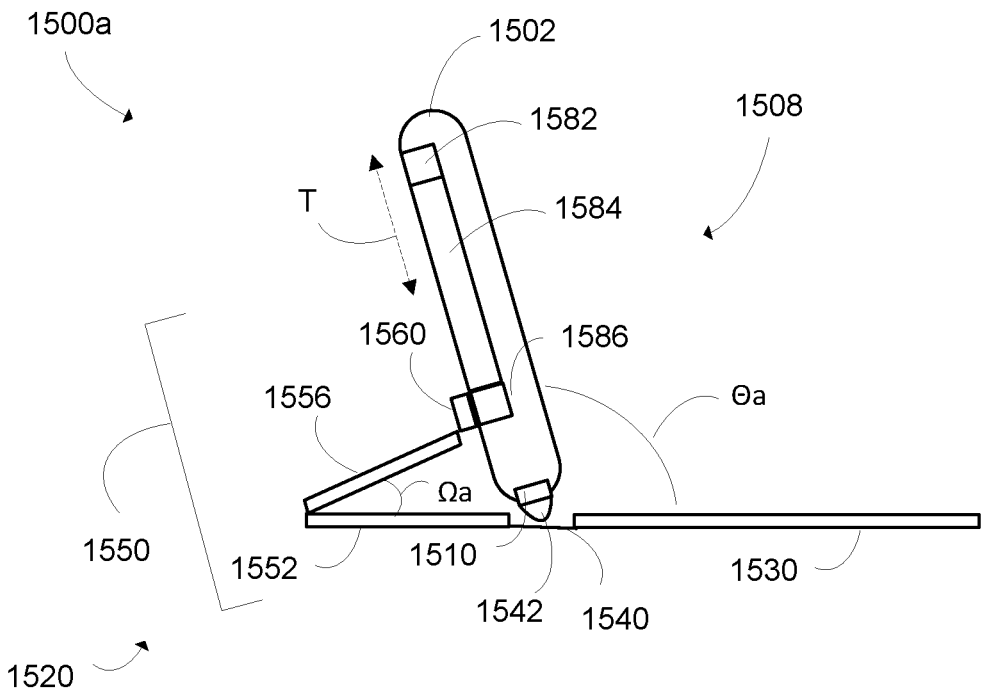
FIGS. 15A-15D are schematic diagrams of embodiments of the mobile computing device and adjustable stand of FIG. 1 in various arrangements that alter the viewing angle of the mobile computing device.
Figure 15B:
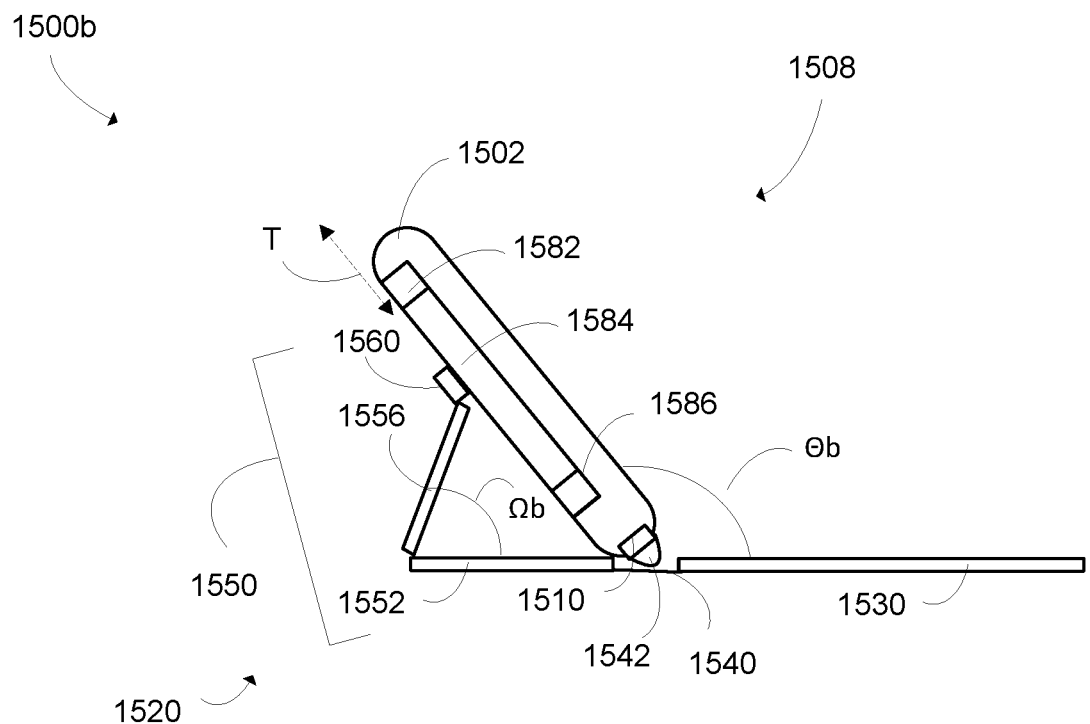
Figure 15C:
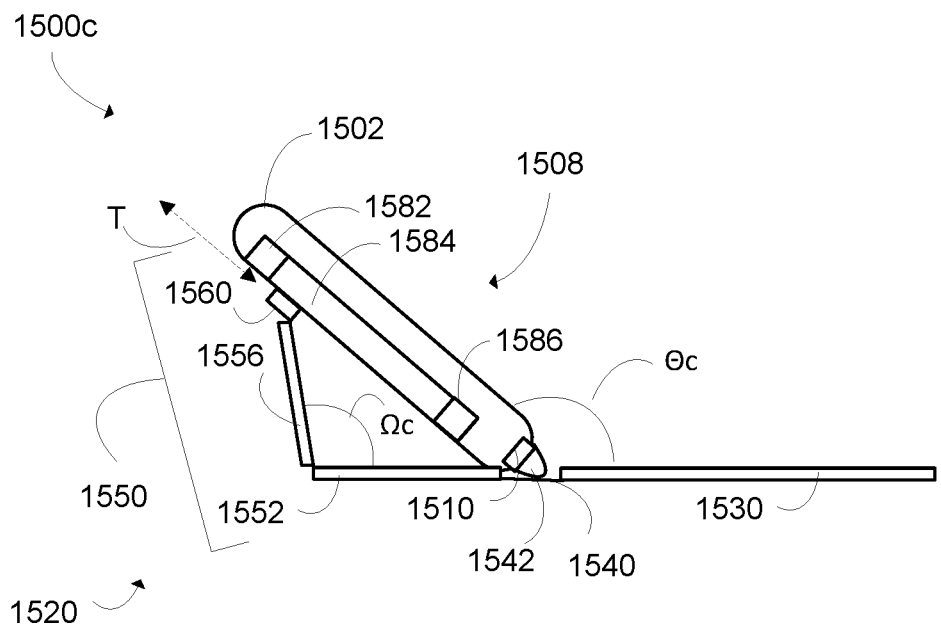
Figure 15D:
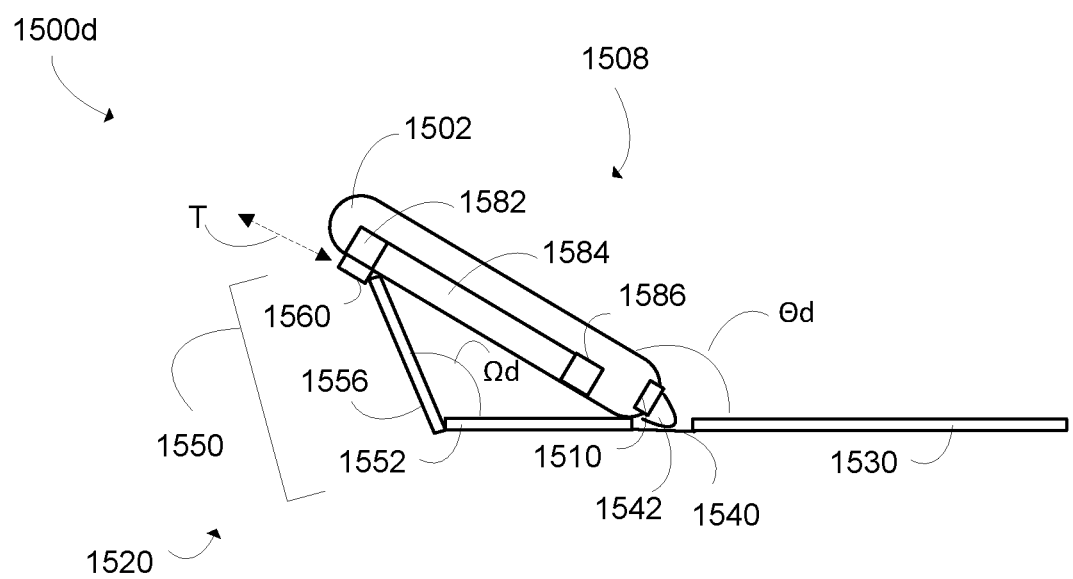

In these figures, the mobile computing device 1502 is shown in progressively more angled arrangement, starting from a more upright arrangement in FIG. 15A to a more angled arrangement in FIG. 15D.

FIG. 15A shows an arrangement 1500a of the mobile computing device shown in FIG. 15A, the mobile computing device 1502 is shown in a substantially upright position. The mobile computing device includes a display 1508 and port 1510, which may be similar to the previously described display 108 and port 510 respectively. Also shown, are a first magnetically susceptible region 1582, a second magnetically susceptible region 1584, and a third magnetically susceptible region 1586 of the mobile computing device 1502, which may be similar to the previously described first magnetically susceptible region 1282, second magnetically susceptible region 1284, and third magnetically susceptible region 1286 respectively.

The adjustable stand 1520 includes a base panel 1530, a hinge assembly 1540, and an adjustable panel 1550. The hinge assembly 1540 includes a dock 1542. In these figures, the hinge assembly 1540 is connected to the port 1510 of the mobile computing device 1502. The adjustable panel 1550 includes a base portion 1552, a rotatable portion 1556, and a slidable portion 1560, which may be similar to the previously described base portion 152, the rotatable portion 156, and the slidable portion 160 respectively.

In the arrangement 1500a, the slidable portion 1560 is positioned in contact with the third magnetically susceptible region 1586. In this position, the rotatable portion 1556 is oriented at an angle $\Omega a$ with respect to the base portion 1552. In this orientation, the rotatable portion 1556 extends in toward the hinge assembly 1540 causing the mobile computing device 1502 to be positioned in an upright position at an angle of $\Theta a$ with respect to the base panel 1530. For example, the angle $\Theta a$ may be approximately 110 degrees. In this position, the magnetic attraction between the slidable portion 1560 and the third magnetically susceptible region 1586 may make sliding the slidable portion 1560 more difficult (e.g., more force is required to slide the slidable portion 1560 along the translational dimension when the slidable portion 1560 is contacting the third magnetically susceptible region 1586 than when it is contact with other portions of the rear surface of the mobile computing device 1502, such as the second magnetically susceptible region 1584).

In the arrangement 1500b, the slidable portion 1560 is positioned in contact with approximately a middle of the second magnetically susceptible region 1584. For example, the slidable portion 1560 may have been moved in a translational direction (e.g., along the rear surface of the mobile computing device 1502 toward a side opposite the port 1510). In this position, the rotatable portion 1556 is oriented at an angle $\Omega b$ with respect to the base portion 1552. For example, the angle $\Omega b$ is greater than the angle $\Omega a$ of arrangement 1500a. In this orientation, the rotatable portion 1556 extends in toward the hinge assembly 1540 to a lesser extent than in the arrangement 1500a. The mobile computing device 1502 is positioned at an angle of $\Theta b$ with respect to the base panel 1530. The angle $\Theta b$ is greater than the angle $\Theta a$. For example, the angle $\Theta b$ may be approximately 125 degrees.

In the arrangement 1500b, the slidable portion 1560 is positioned in contact with approximately a middle of the second magnetically susceptible region 1584. For example, the slidable portion 1560 may have been moved in a translational direction (e.g., along the rear surface of the mobile computing device 1502 toward a side opposite the port 1510). In this position, the rotatable portion 1556 is oriented at an angle $\Omega b$ with respect to the base portion 1552. For example, the angle $\Omega b$ is greater than the angle $\Omega b$ of arrangement 1500a. In this orientation, the rotatable portion 1556 extends in toward the hinge assembly 1540 to a lesser extent than in the arrangement 1500a. The mobile computing device 1502 is positioned at an angle of $\Theta b$ with respect to the base panel 1530. The angle $\Theta b$ is greater than the angle $\Theta a$. For example, the angle $\Theta b$ may be approximately 125 degrees.

In the arrangement 1500c, the slidable portion 1560 is positioned in contact with the second magnetically susceptible region 1584 near an interface between the second magnetically susceptible region 1584 and the first magnetically susceptible region 1582. For example, the slidable portion 1560 may have been moved further in the translational direction away from the hinge assembly 1540. In this position, the rotatable portion 1556 is oriented at an angle $\Omega c$ with respect to the base portion 1552. For example, the angle $\Omega c$ is greater than the angle $\Omega b$ of arrangement 1500b. In this orientation, the rotatable portion 1556 extends primarily upward. The mobile computing device 1502 is positioned at an angle of $\Theta c$ with respect to the base panel 1530. The angle $\Theta c$ is greater than the angle $\Theta c$. For example, the angle $\Theta c$ may be approximately 135 degrees.

In the arrangement 1500d, the slidable portion 1560 is positioned in contact with the first magnetically susceptible region 1582. For example, the slidable portion 1560 may have been moved further in the translational direction away from the hinge assembly 1540. In this position, the rotatable portion 1556 is oriented at an angle $\Omega d$ with respect to the base portion 1552. For example, the angle $\Omega d$ is greater than the angle $\Omega c$ of arrangement 1500c. In this orientation, the rotatable portion 1556 extends primarily upward and to a lesser extent away from the hinge assembly 1540. The mobile computing device 1502 is positioned at an angle of $\Theta d$ with respect to the base panel 1530. The angle $\Theta d$ is greater than the angle $\Theta c$. For example, the angle $\Theta d$ may be approximately 145 degrees. Although, in this example, angle $\Theta d$ is greater than 90 degrees, in some implementations, the rotatable portion 1556 is orientated at an angle of 90 degrees with respect to the base portion 1552 when the slidable portion is in contact with the first magnetically susceptible region 1582.

It should be understood that the translational dimension T is defined with respect to the rear surface of the mobile computing device 1502. As can be seen in FIGS. 15A-15D, the translational dimension T changes as the orientation of the mobile computing device 1502 changes.

Figure 16:
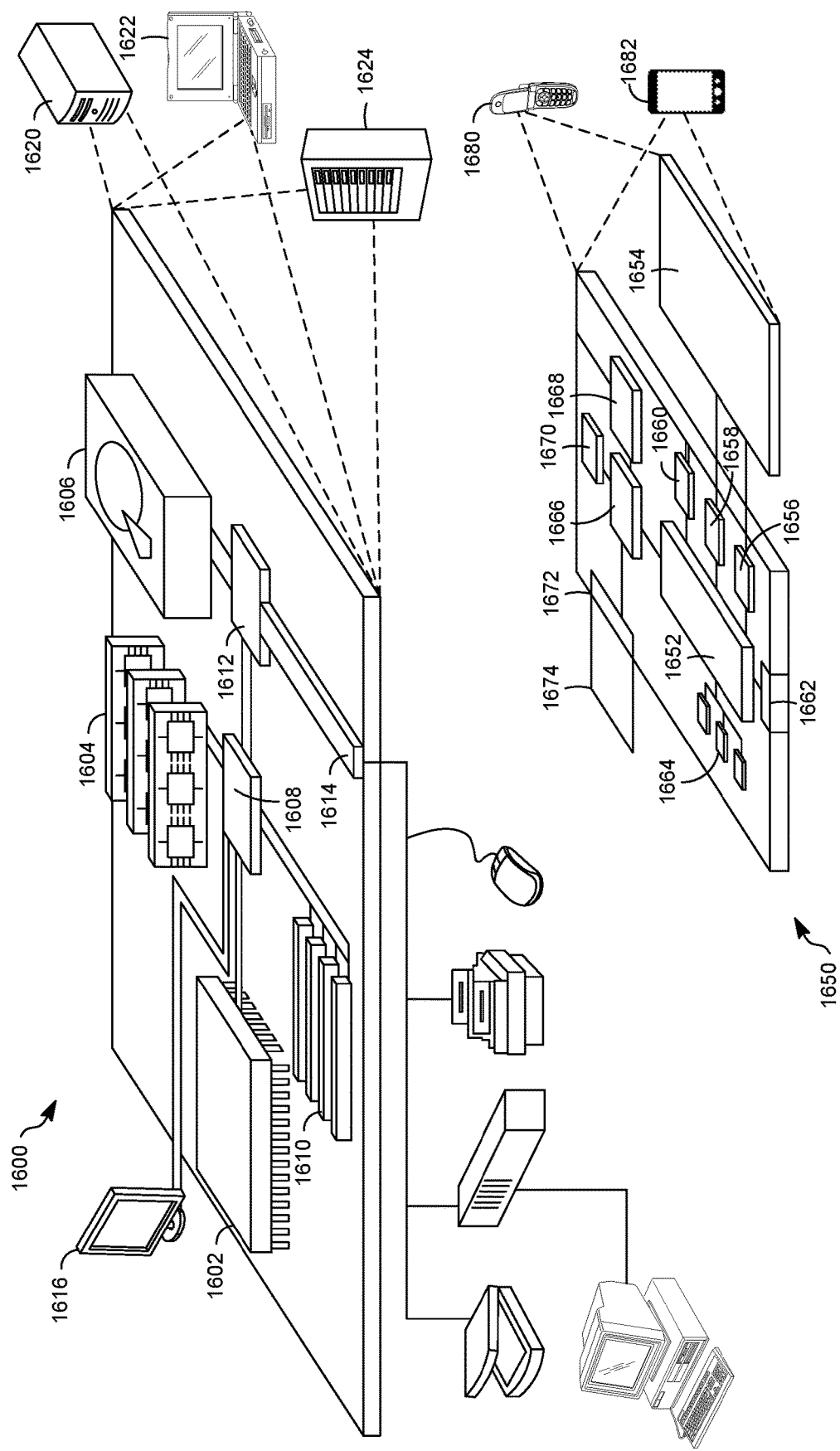
FIG. 16 shows an example of a computer device and a mobile computer device that can be used to implement the techniques described here.

FIG. 16 shows an example of a generic computer device 1600 and a generic mobile computer device 1650, which may be used with the techniques described here. Computing device 1600 is intended to represent various forms of digital computers, such as laptops, desktops, tablets, workstations, personal digital assistants, televisions, servers, blade servers, mainframes, and other appropriate computing devices. Computing device 1650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1600 includes a processor 1602, memory 1604, a storage device 1606, a high-speed interface 1608 connecting to memory 1604 and high-speed expansion ports 1610, and a low speed interface 1612 connecting to low speed bus 1614 and storage device 1606. The processor 1602 can be a semiconductor-based processor. The memory 1604 can be a semiconductor-based memory. Each of the components 1602, 1604, 1606, 1608, 1610, and 1612, are interconnected using various busses, and may be mounted on a common motherboard or in other manners as appropriate. The processor 1602 can process instructions for execution within the computing device 1600, including instructions stored in the memory 1604 or on the storage device 1606 to display graphical information for a GUI on an external input/output device, such as display 1616 coupled to high speed interface 1608. In other implementations, multiple processors and/or multiple buses may be used, as appropriate, along with multiple memories and types of memory. Also, multiple computing devices 1600 may be connected, with each device providing portions of the necessary operations (e.g., as a server bank, a group of blade servers, or a multi-processor system).

The memory 1604 stores information within the computing device 1600. In one implementation, the memory 1604 is a volatile memory unit or units. In another implementation, the memory 1604 is a non-volatile memory unit or units. The memory 1604 may also be another form of computer-readable medium, such as a magnetic or optical disk.

The storage device 1606 is capable of providing mass storage for the computing device 1600. In one implementation, the storage device 1606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1604, the storage device 1606, or memory on processor 1602.

The high speed controller 1608 manages bandwidth-intensive operations for the computing device 1600, while the low speed controller 1612 manages lower bandwidth-intensive operations. Such allocation of functions is exemplary only. In one implementation, the high-speed controller 1608 is coupled to memory 1604, display 1616 (e.g., through a graphics processor or accelerator), and to high-speed expansion ports 1610, which may accept various expansion cards (not shown). In the implementation, low-speed controller 1612 is coupled to storage device 1606 and low-speed expansion port 1614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1600 may be implemented in a number of different forms, as shown in the figure. For example, it may be implemented as a standard server 1620, or multiple times in a group of such servers. It may also be implemented as part of a rack server system 1624. In addition, it may be implemented in a personal computer such as a laptop computer 1622. Alternatively, components from computing device 1600 may be combined with other components in a mobile device (not shown), such as device 1650. Each of such devices may contain one or more of computing device 1600, 1650, and an entire system may be made up of multiple computing devices 1600, 1650 communicating with each other.

Computing device 1650 includes a processor 1652, memory 1664, an input/output device such as a display 1654, a communication interface 1666, and a transceiver 1668, among other components. The device 1650 may also be provided with a storage device, such as a microdrive or other device, to provide additional storage. Each of the components 1650, 1652, 1664, 1654, 1666, and 1668, are interconnected using various buses, and several of the components may be mounted on a common motherboard or in other manners as appropriate.

The processor 1652 can execute instructions within the computing device 1650, including instructions stored in the memory 1664. The processor may be implemented as a chipset of chips that include separate and multiple analog and digital processors. The processor may provide, for example, for coordination of the other components of the device 1650, such as control of user interfaces, applications run by device 1650, and wireless communication by device 1650.

Processor 1652 may communicate with a user through control interface 1658 and display interface 1656 coupled to a display 1654. The display 1654 may be, for example, a TFT LCD (Thin-Film-Transistor Liquid Crystal Display) or an OLED (Organic Light Emitting Diode) display, or other appropriate display technology. The display interface 1656 may include appropriate circuitry for driving the display 1654 to present graphical and other information to a user. The control interface 1658 may receive commands from a user and convert them for submission to the processor 1652. In addition, an external interface 1662 may be provided in communication with processor 1652, so as to enable near area communication of device 1650 with other devices. External interface 1662 may provide, for example, for wired communication in some implementations, or for wireless communication in other implementations, and multiple interfaces may also be used.

The memory 1664 stores information within the computing device 1650. The memory 1664 can be implemented as one or more of a computer-readable medium or media, a volatile memory unit or units, or a non-volatile memory unit or units. Expansion memory 1674 may also be provided and connected to device 1650 through expansion interface 1672, which may include, for example, a SIMM (Single In Line Memory Module) card interface. Such expansion memory 1674 may provide extra storage space for device 1650, or may also store applications or other information for device 1650. Specifically, expansion memory 1674 may include instructions to carry out or supplement the processes described above, and may include secure information also. Thus, for example, expansion memory 1674 may be provided as a security module for device 1650, and may be programmed with instructions that permit secure use of device 1650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1664, expansion memory 1674, or memory on processor 1652, that may be received, for example, over transceiver 1668 or external interface 1662.

Device 1650 may communicate wirelessly through communication interface 1666, which may include digital signal processing circuitry where necessary. Communication interface 1666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1668. In addition, short-range communication may occur, such as using a Bluetooth, WiFi, or other such transceiver (not shown). In addition, GPS (Global Positioning System) receiver module 1670 may provide additional navigation- and location-related wireless data to device 1650, which may be used as appropriate by applications running on device 1650.

Device 1650 may also communicate audibly using audio codec 1660, which may receive spoken information from a user and convert it to usable digital information. Audio codec 1660 may likewise generate audible sound for a user, such as through a speaker, e.g., in a handset of device 1650. Such sound may include sound from voice telephone calls, may include recorded sound (e.g., voice messages, music files, etc.) and may also include sound generated by applications operating on device 1650.

The computing device 1650 may be implemented in a number of different forms, as shown in the figure. For example, it may be implemented as a cellular telephone 1680. It may also be implemented as part of a smart phone 1682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A system comprising:
   a mobile computing device, including:
   a front surface having a display;
   a rear surface having a first magnetically susceptible region disposed between a second magnetically susceptible region, and a third magnetically susceptible region
   a first magnet included in the first magnetically susceptible region, in the second magnetically susceptible region, and in the third magnetically susceptible region;
   a second magnet included the second magnetically susceptible region;
   a third magnet included the third magnetically susceptible region; and
   an adjustable stand for the mobile computing device, including a slidable portion formed with a magnetically susceptible material to slide in a translational dimension along the rear surface, the slidable portion is configured to slide along the first magnetically susceptible region between the second magnetically susceptible region and the third magnetically susceptible region.

2. The system of claim 1, wherein less force is required to slide the slidable portion along the first magnetically susceptible region of the rear surface than is required to slide the slidable portion through the second magnetically susceptible region or the third magnetically susceptible region of the rear surface.

3. The system of claim 1, wherein the translational dimension is parallel to a short axis of the rear surface of the mobile computing device.

4. The system of claim 3, wherein the translational dimension is aligned with an axis between a side of the mobile computing device having a port for connecting to the adjustable stand and a side opposite the mobile computing device.

5. The system of claim 1, wherein the magnetically susceptible material of the adjustable stand includes a magnetic material.

6. The system of claim 1, wherein the adjustable stand further includes:
a base panel sized to substantially cover the front surface of the mobile computing device; and
an adjustable panel sized to substantially cover the rear surface of the mobile computing device and rotatably coupled to the base panel, the adjustable panel being formed from:
the slidable portion;
a rotatable portion that is rotatably coupled to the slidable portion; and
a base portion that is rotatably coupled to the rotatable portion.

7. The system of claim 6, wherein the base panel is rotatably coupled to the adjustable panel via a fabric hinge.

8. The system of claim 7, wherein the adjustable stand further includes a dock that is rotatably coupled to the fabric hinge and the mobile computing device includes a port disposed on a side between the front surface and the rear surface, the dock of the adjustable stand being configured to removably connect to the port of the mobile computing device.

9. The system of claim 8, wherein the base panel includes an input device for the mobile computing device.

10. The system of claim 9, wherein the dock includes a data interface that, when coupled to the mobile computing device, establish a data communication channel between the input device and the mobile computing device.

11. The system of claim 10, wherein the data interface includes a pogo pin.

12. The system of claim 1, wherein the first magnet extends continuously from the second magnetically susceptible region to the third magnetically susceptible region through the first magnetically susceptible region.

13. The system of claim 1, wherein the first magnet is separate from the second magnet.

14. The system of claim 13, wherein the third magnet is separate from the second magnet.

15. A mobile computing device, comprising:
a front surface having a display; and
a rear surface opposite the front surface and coupled to the front surface by an edge region, the rear surface including:
a first magnetically susceptible region;
a second magnetically susceptible region adjacent to the first magnetically susceptible region;
a third magnetically susceptible region, the first magnetically susceptible region being disposed between the second magnetically susceptible region and the third magnetically susceptible region, the second and third magnetically susceptible regions each having a greater magnetic susceptibility than the first magnetically susceptible region;
a first magnet included in the first magnetically susceptible region, in the second magnetically susceptible region, and in the third magnetically susceptible region;
a second magnet included the second magnetically susceptible region; and
a third magnet included the third magnetically susceptible region.

16. The mobile computing device of claim 15, wherein the first magnetically susceptible region allows a slidable portion of an adjustable stand to slide along the first magnetically susceptible region of the rear surface in a translational dimension more readily than the second magnetically susceptible region.

17. The mobile computing device of claim 16, wherein the rear surface is substantially rectangular shaped, having a first side, a second side opposite the first side, a third side between the first side and the second side, and a fourth side between the first side and the second side and opposite the third side, and wherein the translational dimension extending between the third side and the fourth side.

18. The mobile computing device of claim 17, wherein the third magnetically susceptible region extends from the first side to the second side and having a greater magnetic susceptibility than the first magnetically susceptible region.

19. An apparatus comprising:
a base panel sized to substantially cover a front surface of a mobile computing device;
an adjustable panel sized to substantially cover a rear surface of the mobile computing device that is formed from:
a slidable portion that includes a magnetically susceptible material configured to slide along a first magnetically susceptible material disposed between a second magnetically susceptible material and a third magnetically susceptible material, the first magnetically susceptible material having a first portion disposed in a first magnetically susceptible region, the second magnetically susceptible material and a second portion of the first magnetically susceptible material being disposed in a second magnetically susceptible region, the third magnetically susceptible material and a third portion of the first magnetically susceptible material being disposed in a third magnetically susceptible region,
the first magnetically susceptible region being disposed between the second magnetically susceptible region and the third magnetically susceptible region;
a rotatable portion rotatably coupled to the slidable portion; and
a base portion rotatably coupled to the rotatable portion;
a fabric hinge rotatably coupling the base panel to the adjustable panel; and
a dock coupled to the fabric hinge and configured to be removably coupled to a side of the mobile computing device.

20. The apparatus of claim 19, wherein the magnetically susceptible material of the slidable portion includes a magnetic material.

21. The apparatus of claim 19, wherein the magnetically susceptible material of the slidable portion includes a ferromagnetic material.

22. The apparatus of claim 19, wherein the base panel includes an input device for the mobile computing device.

23. The apparatus of claim 22, wherein the input device includes a keyboard.

24. The apparatus of claim 22, wherein the dock includes a data interface that, when coupled to the mobile computing device, establishes a data communication channel between the input device and the mobile computing device.

* * * * *